United States Patent [19]
Almond et al.

[11] Patent Number: 6,112,024
[45] Date of Patent: Aug. 29, 2000

[54] DEVELOPMENT SYSTEM PROVIDING METHODS FOR MANAGING DIFFERENT VERSIONS OF OBJECTS WITH A META MODEL

[75] Inventors: Kenneth Almond, Santa Clara; Robert Wait, San Francisco; Atul Thombre, Fremont; Richung Shaw, Milpitas, all of Calif.

[73] Assignee: Sybase, Inc., Emeryville, Calif.

[21] Appl. No.: 08/724,741

[22] Filed: Oct. 2, 1996

[51] Int. Cl.$^7$ ................................................. G06F 17/00
[52] U.S. Cl. .................... 395/703; 395/712; 707/203; 707/511
[58] Field of Search .................... 395/683, 703, 395/500, 701, 702, 705, 712; 707/203, 101, 511

[56] References Cited

U.S. PATENT DOCUMENTS

| | | | |
|---|---|---|---|
| 4,558,413 | 12/1985 | Schmidt et al. | 707/203 |
| 4,809,170 | 2/1989 | Leblang et al. | 395/703 |
| 5,019,961 | 5/1991 | Addesso et al. | 364/192 |
| 5,339,435 | 8/1994 | Lubkin et al. | 395/712 |
| 5,550,971 | 8/1996 | Brunner et al. | 707/3 |
| 5,574,898 | 11/1996 | Leblang et al. | 707/1 |
| 5,596,746 | 1/1997 | Shen et al. | 707/101 |
| 5,675,802 | 10/1997 | Allen et al. | 395/703 |
| 5,737,736 | 4/1998 | Chang | 707/102 |
| 5,862,386 | 1/1999 | Joseph et al. | 395/712 |
| 5,903,902 | 5/1999 | Orr et al. | 707/517 |

OTHER PUBLICATIONS

Katz, R., "Towards A Unified Framework For Version Modeling," Electrical Engineering and Computer Science Dept., University of California at Berkeley, pp. 1–45.

*Primary Examiner*—James P. Trammell
*Assistant Examiner*—Demetra R. Smith
*Attorney, Agent, or Firm*—John A. Smart

[57] ABSTRACT

An "Object Cycle" versioning system having an Object Cycle Server is described. The server communicates over a wire or a network for providing versioning services to multiple clients. During a user session, a user invokes operation of the system from within the development environment of the particular client being used. From the perspective of the Object Cycle Server, each client is simply "a client" (without regard to proprietary nature) which desires to store "an object." The Object Cycle Server, in turn, maps the object into a meta model which serves as a container for facilitating version control. With the model, therefore, operations supported by the system for versioning will execute correctly even if the objects are stored in a format other than a relational database, such as an object-oriented database, a file server, or other storage system. The model separates out the name of an object from where the object itself is actually stored. As additional versions of the object are created, the number of object instances increases. Once an instance has been created, versioning activities can be undertaken, such as checking in, checking out, and the like—operations which are atomic at the object level. By separating out these areas of functionality into (conceptually) different nodes of a meta model, system performance is enhanced.

35 Claims, 16 Drawing Sheets

DEVELOPMENT SYSTEM PROVIDING METHODS FOR MANAGING DIFFERENT VERSIONS OF OBJECTS WITH A META MODEL

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the field of software development and, more particularly, to versioning of source code modules and other objects employed for software development.

Modern day software development is typified by sizable development teams comprising software engineers developing various code modules which, when combined, form a computer program. Here, individuals typically create various scripts or source code files which form the individual modules;. Since at any given point in time several individuals may be working on the project, there is a need to coordinate their efforts and manage the source code modules which each individual creates. The general environment, therefore, is one of a team which needs to coordinate it, efforts.

To assist with coordination, various "version control" systems have been developed. Typically, a version control system implements a scheme where various individual programmers "check in" and "check out" source code modules which comprise the project being developed. The check in/check out approach provides modules with a "versioning label" which assists with the task of coordinating the efforts of the individuals which form the team. These versioning labels provide the basic mechanics for a version control system.

Underlying the basic mechanics of version control is a framework for process. In other words, in addition to the mechanics of versioning, there exists an organization which assists in process flow and coordination for the creation of a software product. The mechanics provide the basic operations needed for versioning; the framework provides the structure which facilitates process flow. Structure itself reduces risk, since it lends a repeatable model to the system.

Present-day versioning control systems adopt an approach that is file-based in nature. This approach—one which is based on shared files on a disk storage device—is problematic. In particular, a system employing such an approach is slow and unreliable. Such a system is slow because it employs a centralized control or locking manager through which each request for access must be processed. This represents a bottleneck to system performance. Further, the centralized control leads to difficulty in backing up one's project, thereby leading to decreased system reliability. For instance, it is a difficult task to undertake a "live" backup while source code modules remain checked out. As a result, the backup might actually include an inconsistent view of the system.

Present-day systems essentially serve as "dumb" repositories. In other words, such systems are simple, dumb managers of access rights and, thus, do not lend intelligence to the process. Accordingly, the operations supported are limited in functionality. In particular, a dumb repository cannot capture relationships between files or modules. Such relationships are common between source modules. For instance, a C source file (i.e., .c file) often depends on one or more "header" files (.h) or other "include" files. In fact, a number of arbitrary relationships might exist in a development project, such as a particular module depending on a web page, which in turn points to another object, and so forth and so on, to an arbitrary level. A dumb repository or file system has no facility for capturing these semantic relationships which can exist between source code modules or other objects in a project.

An additional problem with present-day systems is that of lack of scalability. Existing file-based systems do not provide scalability methodology, such as parallel processing. Unlike SQL database systems, for instance, file-based systems do not include an architectural design which support; a high transaction volume—a high number of users accessing a particular object or set of objects. All told, since existing products are all based on file-based technology, they are ill-suited to scale to a level supporting 1,000 or more users at a time.

Another limitation with existing systems is that they are designed to handle only those objects which exist as text files. Today, however, a project under development often comprises objects other than text-based source files. For instance, a product specification might exist as a Microsoft Word (i.e., proprietary) word processing document. Resources for a project might include, on the other hand, various HTML (hypertext markup language) pages having bitmaps. With the explosive growth of multimedia applications and web-based applications, there exists a need for supporting versioning not only of text-based files but also of any arbitrary object which might comprise a project.

SUMMARY OF THE INVENTION

An "Object Cycle" versioning system, constructed in accordance with the present invention, includes an Object Cycle Server which communicates over a wire or a network for providing versioning services to multiple clients. In particular, the Object Cycle Server includes a Remote Procedure Call (RPC) interface which allows the server to be easily integrated into the operation of the various clients. The RPC interface allows the system to surface an Object Cycle API (Application Programmning Interface) for development system clients. To an individual client, this interface appears as if it is a simple collection of API calls available to the client. Additionally, the system provides a user interface—the Object Cycle manager—which also communicates with the Object Cycle Server via the RPC interface.

During operation, the user invokes operation of the system from within the development environment of the particular client being used. In the case of a Powersoft PowerBuilder client, for instance, the user can access a "check in" menu option from the editor within that system. Here, the client can instruct the system to check in any arbitrary object which the user desires versioning control for. A completely different client, such as the Microsoft® Visual C++client, also can perform a "check in" in a similar manner. The approach allows a multi-tool environment, each concerned with the development of its own particular type of object (e.g., a .cpp file for Microsoft Visual C++) to share a version control repository. From the perspective of the Object Cycle Server, each client is simply "a client" (without regard to proprietary nature) which desires to store "an object." The Object Cycle Server, in turn, maps the object into a schema—a meta model—which facilitates version control.

The meta model approach allows the system to map objects to representations other than that provided in relational databases. In essence, the model serves as a container which facilitates version control. With the model, therefore, operations supported by the system for versioning will execute correctly even if the objects are stored in a format other than a relational database, such as an object-oriented database, a file server, or other storage system.

A project, represented by a root node, contains objects. The model separates out the name of an object from where the object itself is actually stored. As a result, the system can accommodate multiple names pointing to a single storage location. In other words, multiple names can point to the same object or entity, as indicated by an entity node. Once the object is located at the entity node, multiple instances or versions of that object can exist, each being represented by an instance node. The number of instances which can exist for an object include none, one, or many. The case of none is where the object is just in the process of being created—the object itself has not been completely created. Once at least one object has been created, there will exist at least one instance. As additional versions of the object are created, the number of object instances increases. In the currently-preferred embodiment, each individual version is stored as a complete separate copy. Those skilled in the art will appreciate that such an embodiment can be modified to store each individual version as a difference (delta) copy—that is, only storing that which has changed from one version to the next. Once an instance has been created, versioning activities can be undertaken, such as checking in, checking out, and the like—operations which are atomic at the object level.

Action nodes are provided to indicate that an action is occurring on one or more objects. User nodes, in turn, indicate that a user can undertake one or more actions. Here, the user requests a service or action on an instance of an object. Finally, link nodes are provided by the meta model to capture semantic relationships between objects, such as the relationship that a source file (e.g., ".c" file) depends on a header file (e.g., ".h" file). In other words, this allows an object instance to point to another object, and so forth and so on, up to an arbitrary level of links. A specific link points to a particular object instance. If an object instance links to multiple other objects (e.g., a .c file which links to three .h files), then the object instance would maintain a separate link for each dependent object, for representing that particular relationship. In other words, although a link points to only one linked object, any object can have multiple links. By separating out these areas of functionality into (conceptually) different nodes, system performance is enhanced.

DETAILED DESCRIPTION OF A PREFERRED EMBODIMENT

The following description will focus on the presently preferred embodiment of the present invention, which is operative in a network environment for developing and executing client/server database applications. The present invention, however, is not limited to any particular application or environment. Instead, those skilled in the art will find that the present invention may be advantageously applied to any application or environment requiring versioning of objects. The description of the exemplary embodiment which follows is, therefore, for the purpose of illustration and not limitation.

Standalone System Hardware

Figure 1A:
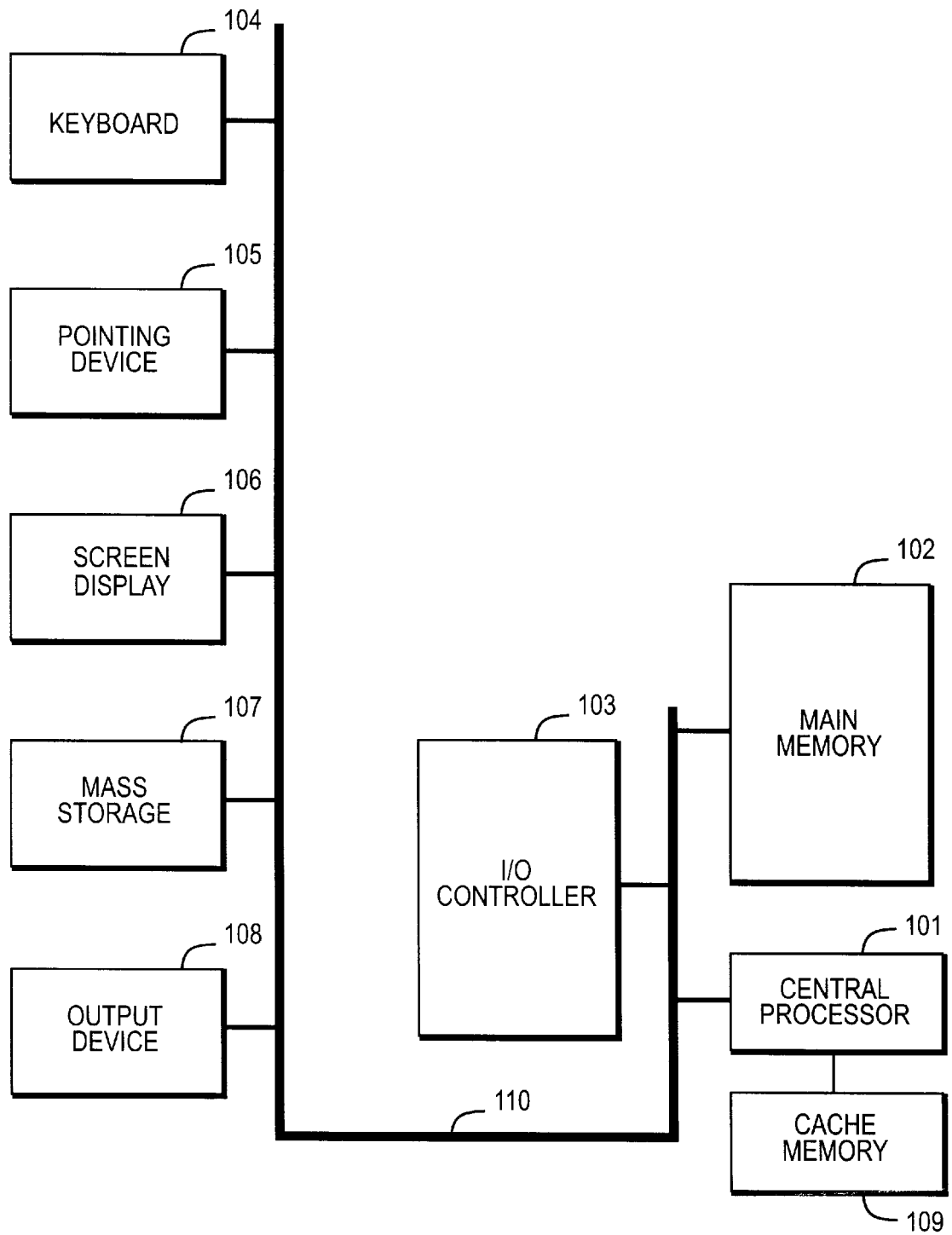
FIG. 1A is a block diagram of a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a mass storage 107 (e.g., hard or fixed disk, optical disk, magneto-optical disk, or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
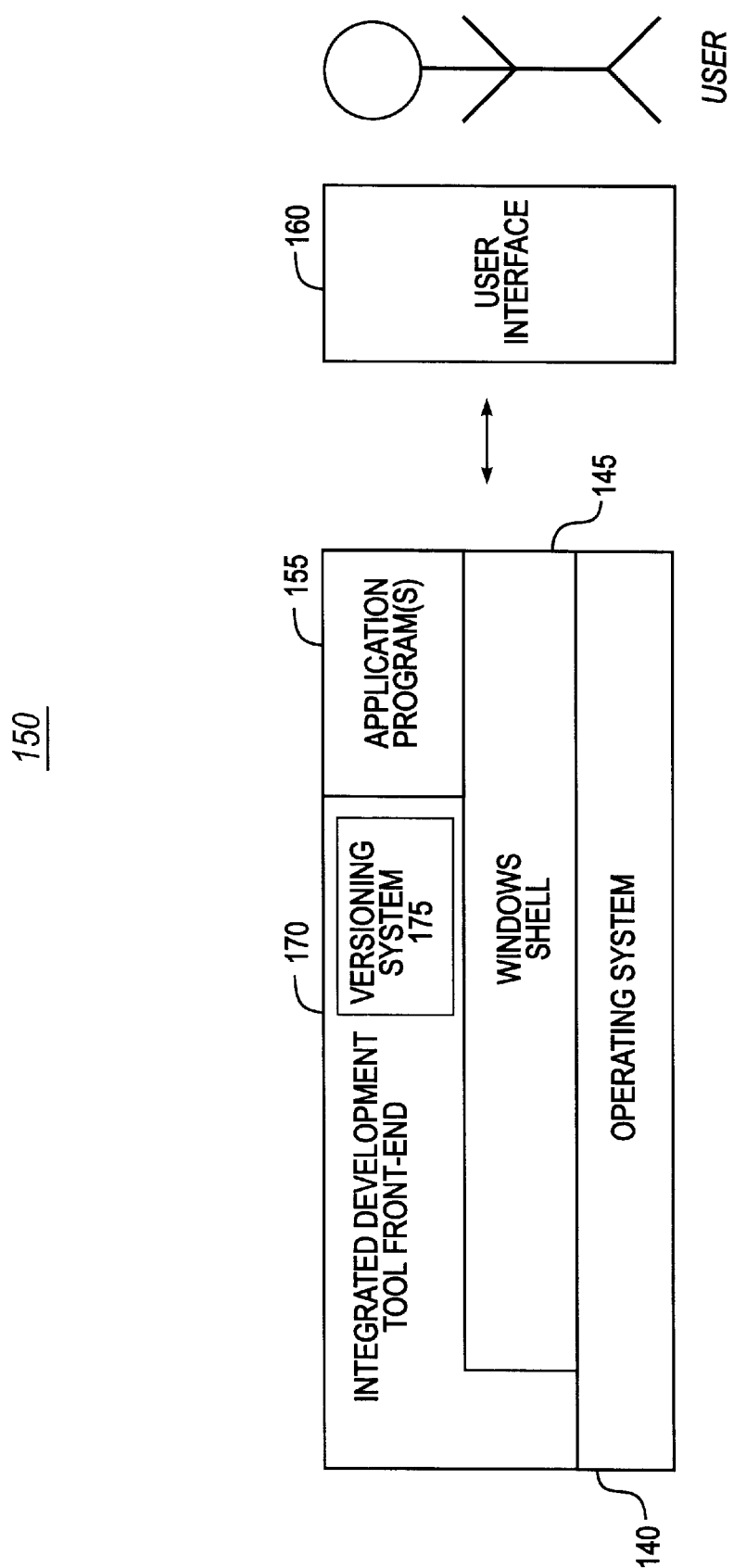
FIG. 1B is a block diagram of a software system for controlling the operation of the computer system of FIG. 1A.

Illustrated in FIG. 1B, a computer software system 150 is provided for directing the operation of the computer system

100. Software system 150, which is stored in system memory 102 and on disk memory 107, includes a kernel or operating system (OS) 140 and a windows shell 145. One or more application programs, such as application software 155, may be "loaded" (i.e., transferred from storage 107 into memory 102) for execution by the system 100. The system also includes a user interface 160 for receiving user commands as input and displaying user data as output.

Also shown, the software system 150 includes an integrated development tool front-end 170 having an "Object Cycle" versioning System 175 of the present invention. The RDBMS front-end 170 may comprise any one of a number of database development front-ends, including Powersoft PowerBuilder™, Powersoft Optima++™, dBASE®, Paradox®, Microsoft® Access, Microsoft® Visual C++, or the like. In an exemplary embodiment, the front-end will also include SQL access drivers (e.g., Borland SQL Links, or Microsoft ODBC drivers) for accessing SQL database server tables in a Client/Server environment. The Object Cycle versioning system itself will now be described in greater detail.

Development System with Improved Versioning of Objects

A. Architecture

Figure 2:
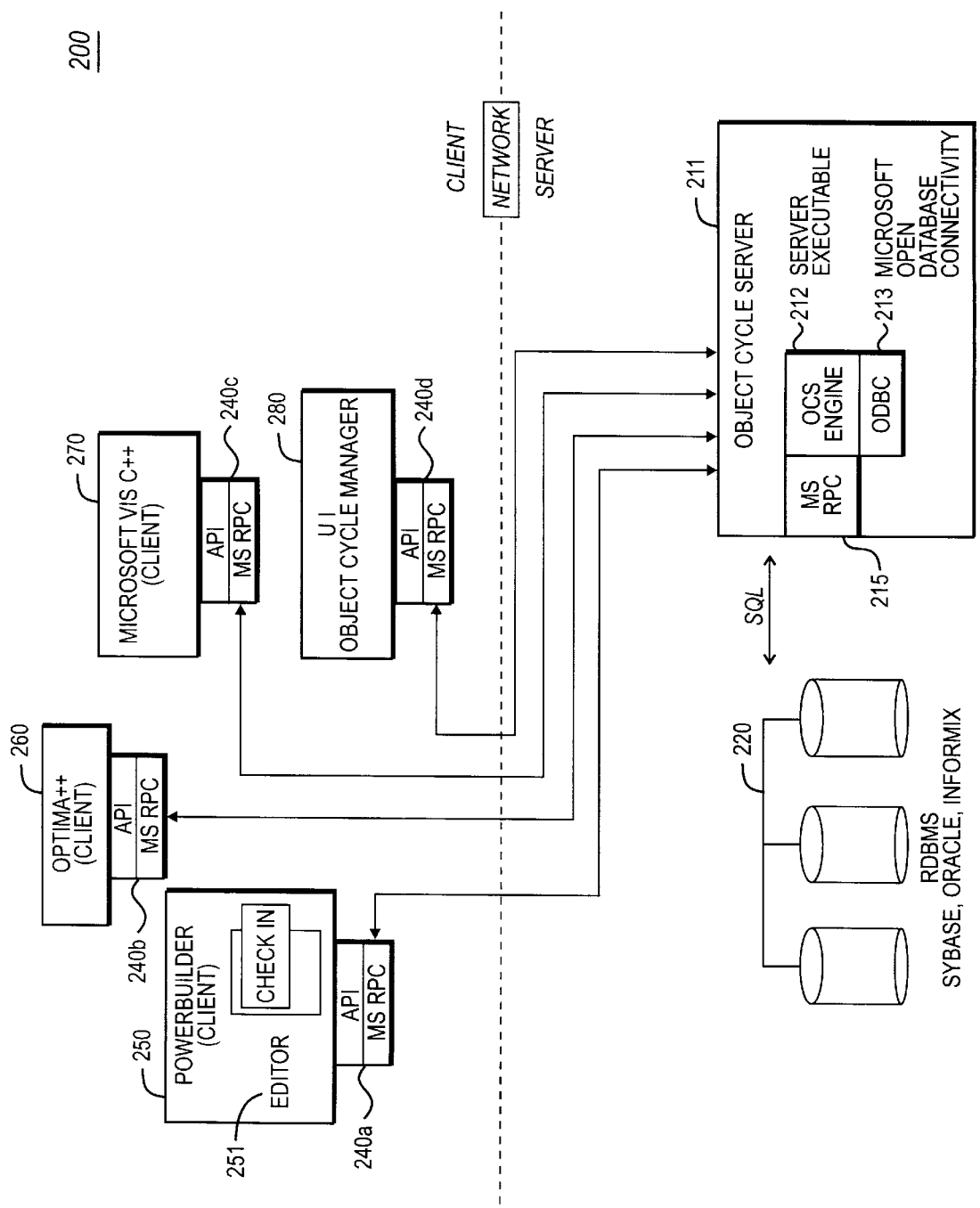
FIG. 2 is a block diagram illustrating an "Object Cycle" versioning system of the present invention, as implemented in a client/server environment.

While the present invention may operate within a single (standalone) computer (e.g., system 100 of FIG. 1A), the present invention is preferably embodied in a multi-user computer system, such as a client/server system. FIG. 2 illustrates such a system, Object Cycle versioning system 200, constructed in accordance with the present invention. At its core, the system includes an Object Cycle Server 211 which comprises a separate executing process, typically running on a server machine (e.g., Windows NT server). The server includes a kernel or engine 212—the main executable module for the server 211. The engine 212 communicates with relational database tables 220, through a database interface layer (ODBC) 213. In an exemplary embodiment, the database interface layer 213 is provided as an ODBC (Microsoft Open Database Connectivity) layer or socket, which accommodates various drivers (e.g., Sybase, Oracle, Informix, IBM DB2, and the like) for communicating with the various relational database tables 220. In this manner, the Object Cycle server can employ as the tables 220 relational database tables from a variety of vendors, so long as a database driver exists which allows the Object Cycle Server to access information from the particular tables. This approach allows the system 200 to easily be integrated with the systems of a variety of database vendors.

The Object Cycle Server 211 communicates over a wire or a network with multiple clients. In particular, the Object Cycle Server 211 includes a Remote Procedure Call (RPC) interface 215, which allows the server 211 to be easily integrated into the operation of the various clients. In an exemplary embodiment, the RPC interface 215 employs Microsoft Remote Procedure Call protocol (available from Microsoft Corp. of Redmond, Wash.) for surfacing an Object Cycle API (Application Programming Interface) 240a, 240b, 240c, 240d for use by each of the development system clients. To an individual client, this interface appears as if it is a simple collection of API calls available to the client; each function appears at interfaces 240. Since the function invocations of the API are in fact transparent remote calls, the client is shielded from complexity. Actual execution of the function, however, occurs in the Object Cycle Server 211, specifically at engine 212.

As shown, the interfaces 240 communicate or "talk" (i.e., communicates via an understood protocol) with various clients. Client 250, for example, comprises a PowerBuilder™ development environment which is executing on a client machine (e.g., workstation or personal computer connected to a network). Other clients, such as rapid application development environment 260 (e.g., Powersoft Optima++™) and C++development environment 270 (e.g., Microsoft® Visual C++), communicate with the Object Cycle Server 211 via the interfaces 240.

Additionally, the system provides a user interface—the Object Cycle manager 280—which also communicates with the Object Cycle Server 211 via the interfaces 240. As shown, the Object Cycle manager 280 can be considered a client as well. Specifically, its interaction with the system occurs through the interfaces 240, in the same manner as done by other clients (e.g., PowerBuilder client). The interfaces 240, therefore, provide a clear dividing line between a server side of the system and a client side of the system. Prior art systems, in contrast, do not provide a clear separation of functionality, thereby requiring some versioning intelligence at the client. The difficulty with that approach, however, is that other clients do not have access to intelligence (e.g., information about semantic relationships between objects) which is limited to a particular client.

During operation, the user invokes operation of the system from within the development environment of the particular client being used. In the case of the PowerBuilder client 250, for instance, the user can access a "check in" menu option from the editor 251 within that system. Here, the client can instruct the system to check in any arbitrary object which the user desires versioning control for. A completely different client, such as the Microsoft® Visual C++client, also can perform a "check in" in a similar manner. The approach allows a multi-tool environment, each concerned with the development of its own particular type of objects (e.g., a .cpp file for Microsoft® Visual C++) to share a version control repository. From the perspective of the Object Cycle Server 211, each client is simply "a client" (without regard to proprietary nature) which desires to store "an object." The Object Cycle Server, in turn, maps the object into a schema which performs version control. This schema or "meta model" will be described next.

B. Meta Model

Figure 3:
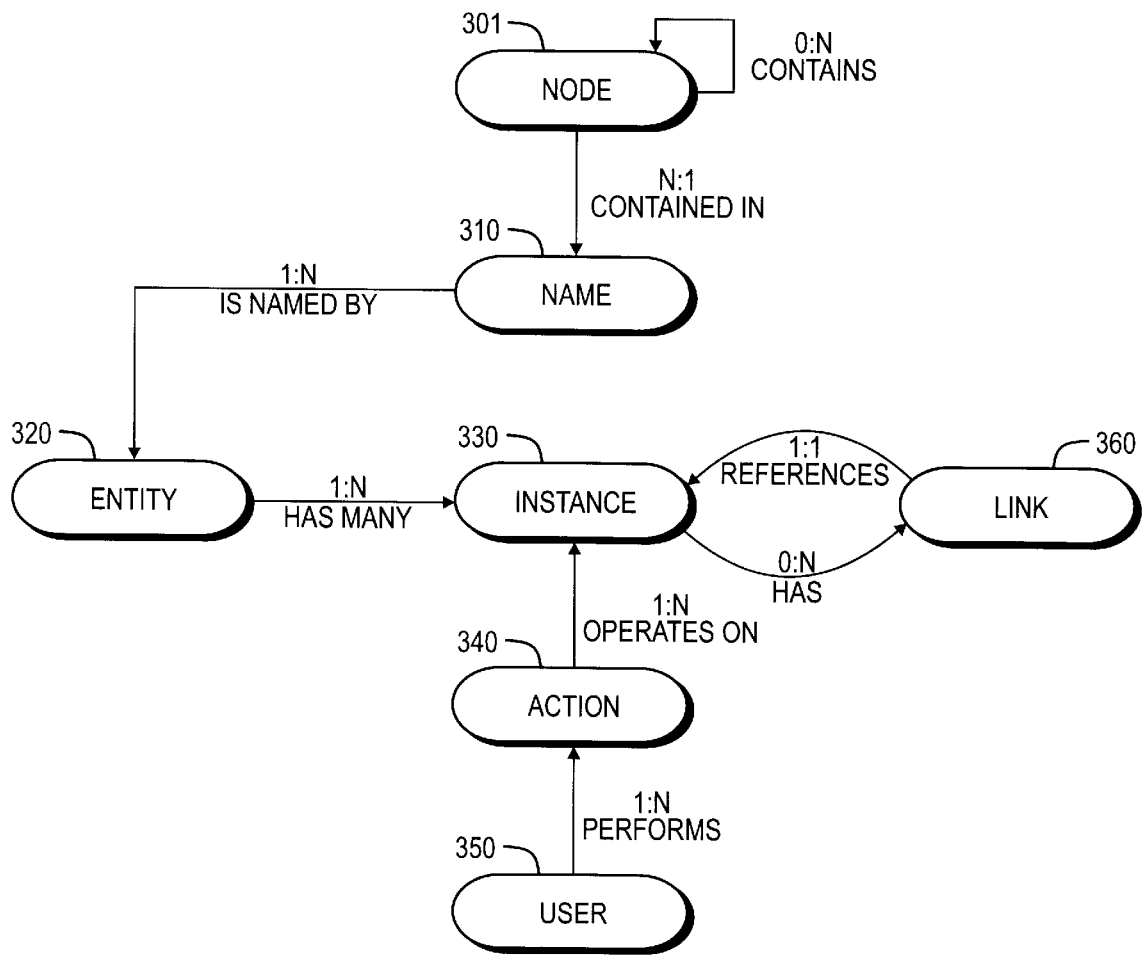
FIG. 3 is a block diagram illustrating a meta model constructed in accordance with the present invention, which allows the system to map objects to representations other than that provided by relational databases.

FIG. 3 illustrates a meta model 300 constructed in accordance with the present invention. The meta model approach allows the system to map objects to representations other than that provided in relational databases. In essence, the model serves as a container which facilitates version control. With the model, therefore, operations supported by the system for versioning will execute correctly even if the objects are stored in a format other than a relational database, such as an object-oriented database, a file server, or other storage system.

A project, represented by root node 301, contains objects. As shown, the model separates out the name of an object from where the object itself is actually stored. As a result, the system can accommodate multiple names pointing to a single storage location. Therefore, multiple names (indicated by N number of names at name node 310) can point to the same object or entity, as indicated by entity node 320. Once the object is located, at entity node 320, there can exist multiple instances or versions of that object, as indicated by instance node 330. The number of instances which can exist for an object include none, one, or many. The case of none is where the object is just in the process of being created—the object itself has not been completely created. Once at least one object has been created, there will exist at least one instance. As additional versions of the object are created, the number of object instances, as represented by instance node 330, increases. Each individual version can be stored as a complete separate copy, or as a difference (delta) copy. Once an instance has been created, versioning activities can be undertaken, such as checking in, checking out, and the like—operations which are atomic at the object level.

Action node 340 indicates that an action may occur on one or more objects. User node 350, in turn, indicates that a user can undertake one or more actions. Here, the user requests a service or action on an instance of an object. Finally, link node 360 captures semantic relationships between objects, such as the relationship that a source file (e.g., "c" file) depends on a header file (e.g., ".h" file). In other words, this allows an object instance to point to another object, and so forth and so on, up to an arbitrary level of links. As shown, an instance can have zero or more links. A specific link, in turn, points to a particular object instance. If an object instance links; to multiple other objects (e.g., a .c file which links to three .h files), then the object instance would maintain a separate link for each dependent object, for representing that particular relationship. In other words, although a link points to only one linked object, any object can have multiple links. By separating out these areas of functionality into (conceptually) different nodes, system performance is enhanced.

C. Preferred User Interface

Figure 4A:
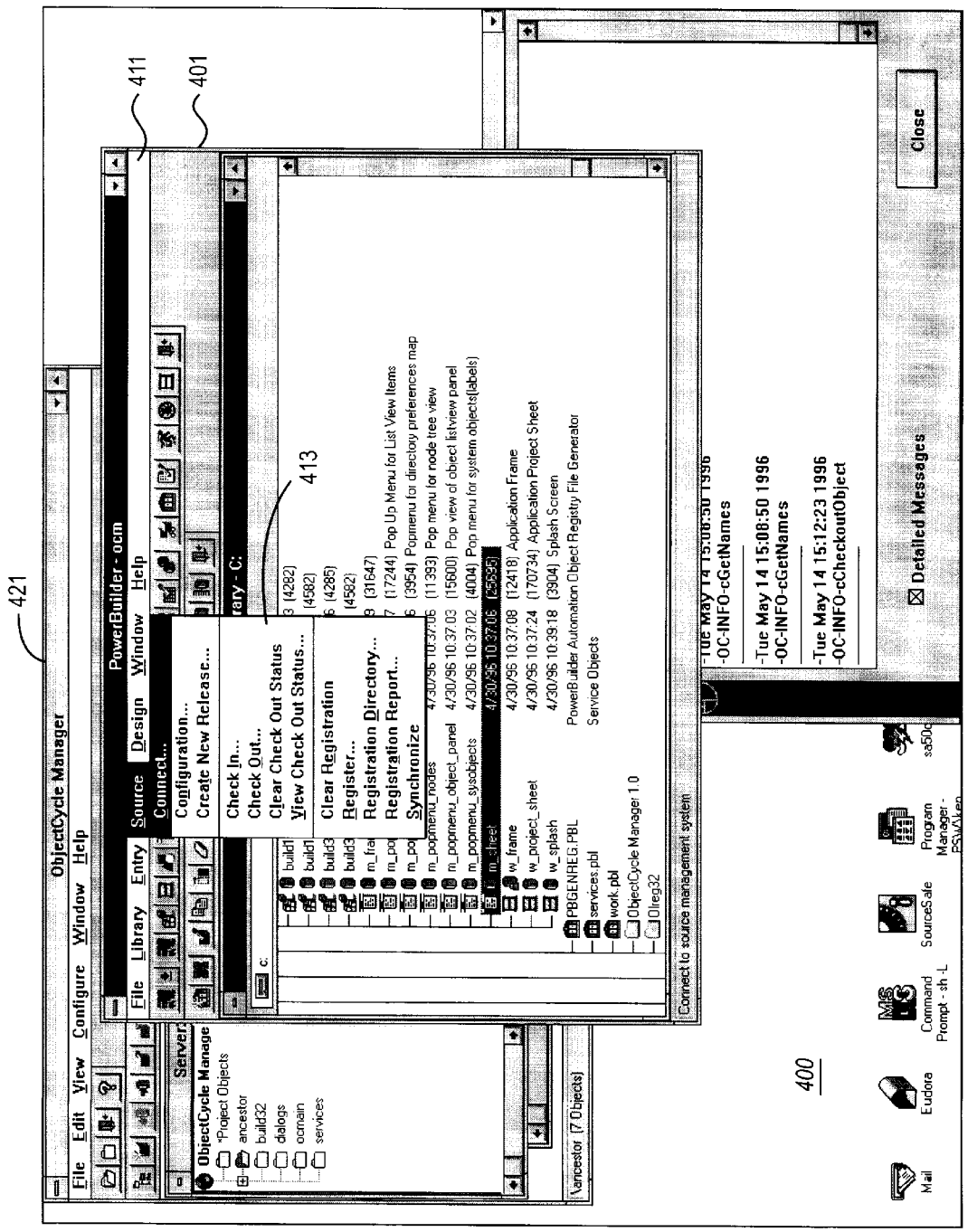
FIGS. 4A–B are bitmap screenshots illustrating a desktop view displaying a development system (e.g., PowerBuilder) standard control management interface operating in the foreground in conjunction with an Object Cycle manager user interface of the present invention operating in the background.

FIG. 4A illustrates a desktop view 400 displaying a PowerBuilder standard control management interface 401 in the foreground, and the Object Cycle manager user interface 421 in the background. Here, the user "connects" the Object Cycle versioning system to the PowerBuilder development system as follows. The user selects pull down "source" menu 413 from menu bar 411 of the control interface 401. From this pull down menu, the user can instruct the system to "connect" the Object Cycle versioning system to the development system.

Figure 4B:
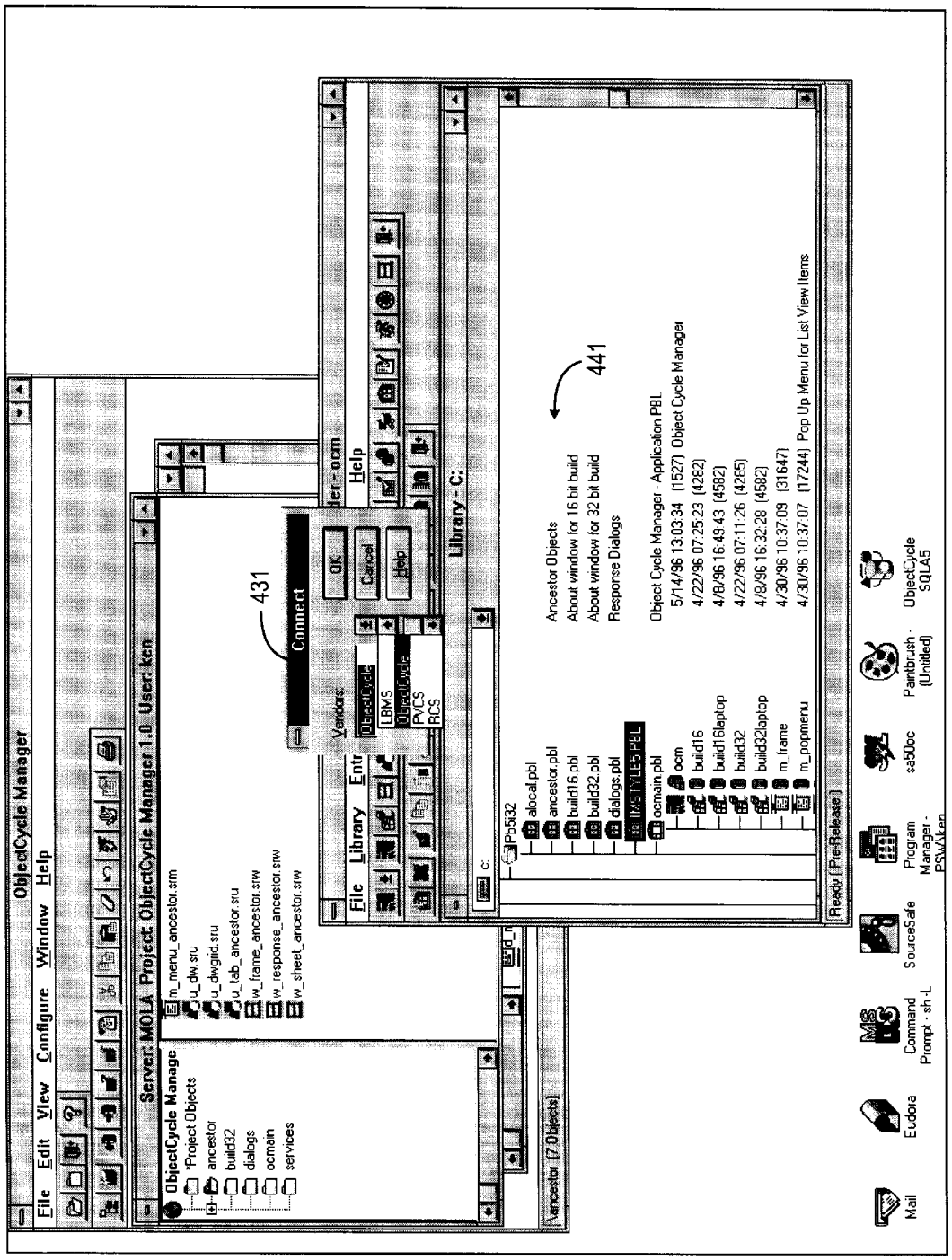

In particular, upon the user selecting the "connect" menu choice from pull down menu 413, the PowerBuilder interface 411 displays a "connect" dialog 431, as shown in FIG. 4B. Now, the user specifies that the development system connect to the Object Cycle versioning system, by simply selecting a displayed menu choice for the versioning system. The development system provides an external interface whereby various modules, such as third party tools, can register themselves for availability to the system.

Also shown in FIG. 4B, the interface 411 displays a hierarchical view 441 of objects available to the development system. The view 441 is a library painter (graphic browser) view displaying the various libraries which comprise an application. At a high level, an application exists as an application object. This application object, in turn, comprises various objects which make up the application, such as libraries, forms, menus, screen buttons, and the like. The hierarchical view 441 allows the user to easily navigate among these objects with ease.

Figure 5:
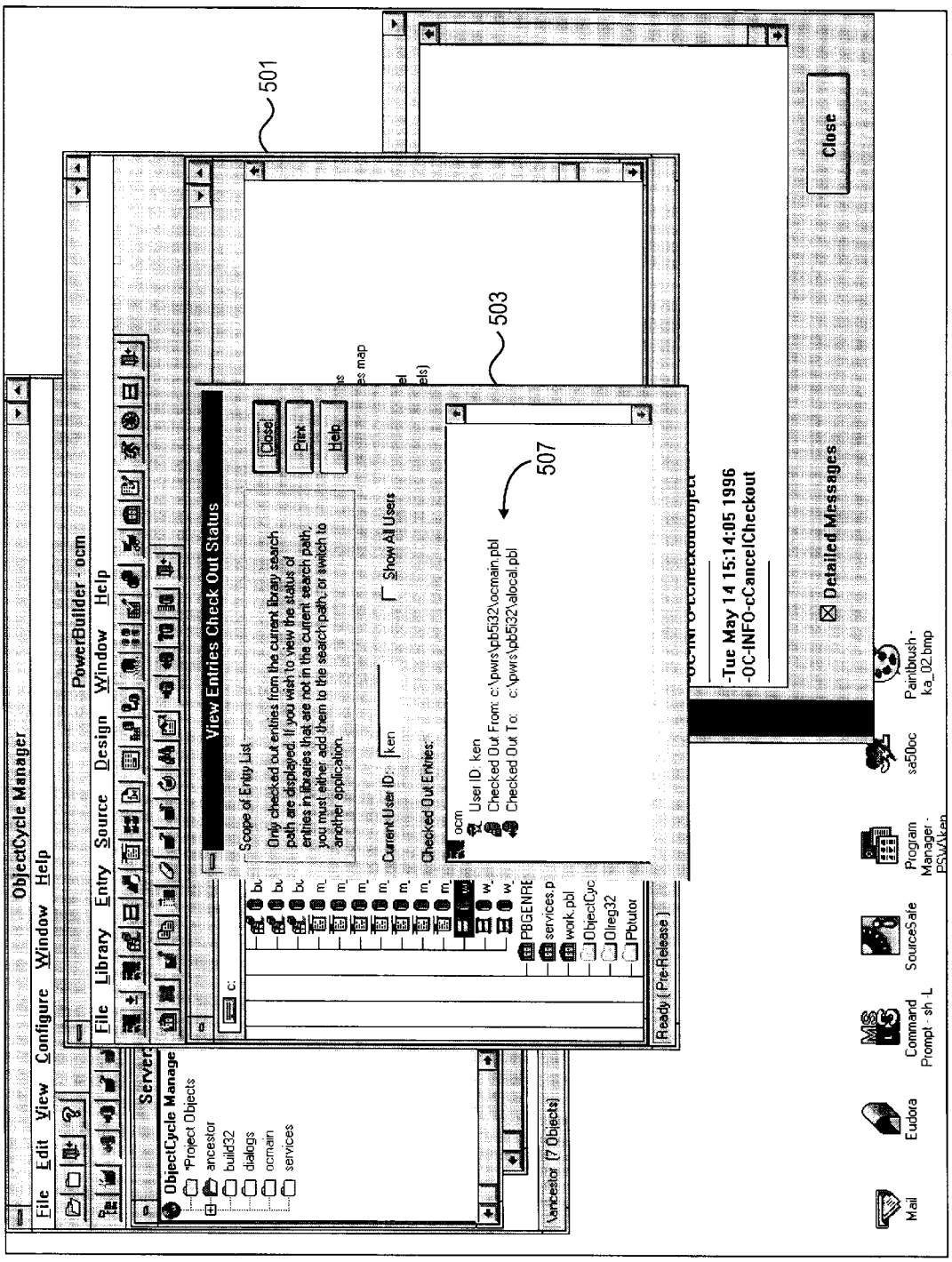
FIG. 5 is a bitmap screenshot illustrating a user interface for allowing a user to view the check-out status of items or entries.

As shown in FIG. 5, the user can view the check-out status of items or entries displayed in the library printer. For the library painter view shown at 501, for instance, the user can invoke a View Entries Check Out Status dialog 503, for a selected project. The dialog 503 includes a list 507 indicating currently checked out entries for the user.

Returning to the pop up menu 413 shown in FIG. 4A, the "register" menu choice allows the user to register an item with the system. Before an object can be checked out, it must be "checked in" for the first time; this is the process of registering the object with the system. The clear registration menu choice, on the other hand, removes an object from the repository.

Figure 6:
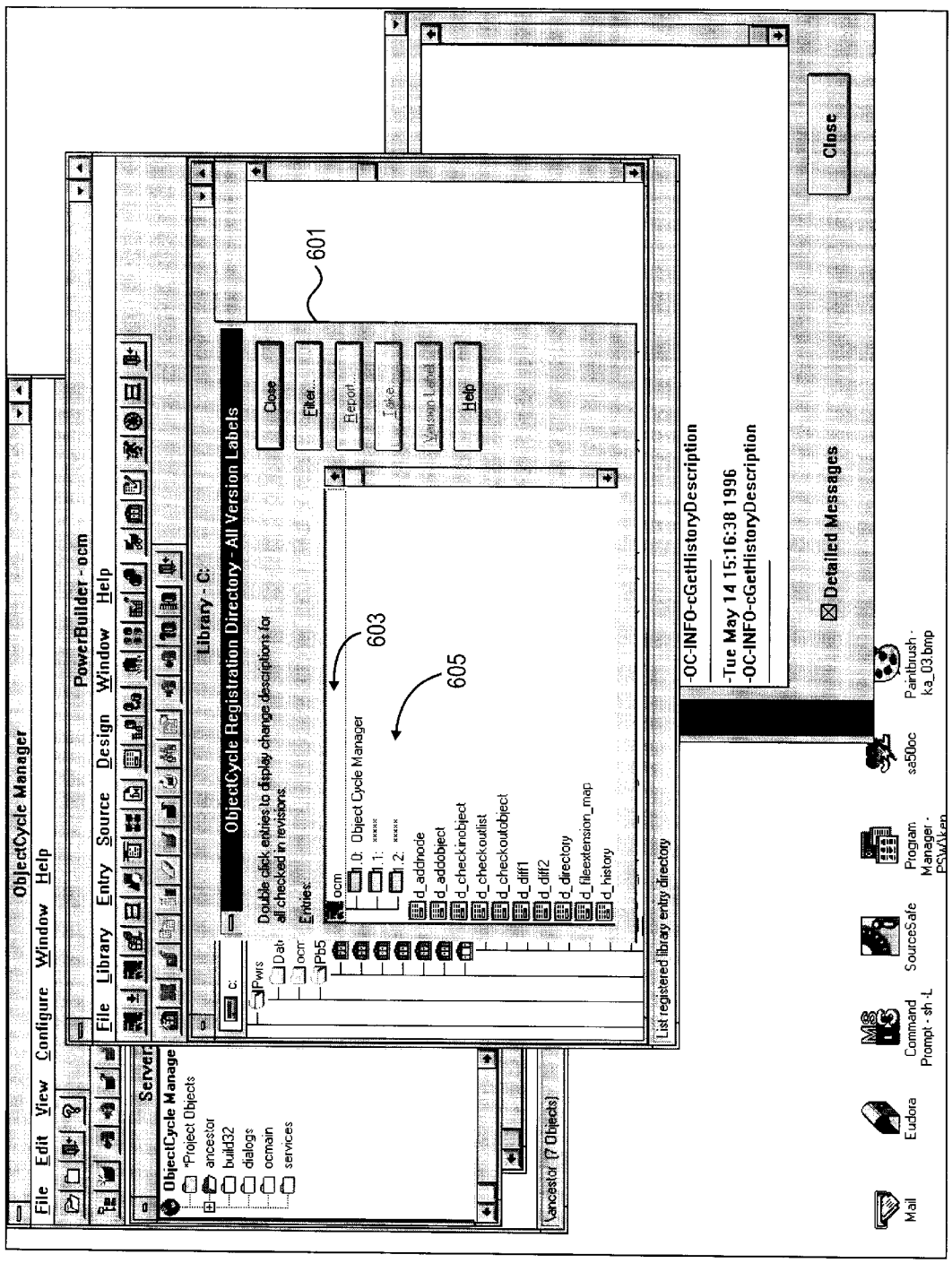
FIG. 6 is a bitmap screenshot illustrating an Object Cycle registration directory dialog provided by the system.
Figure 7A:
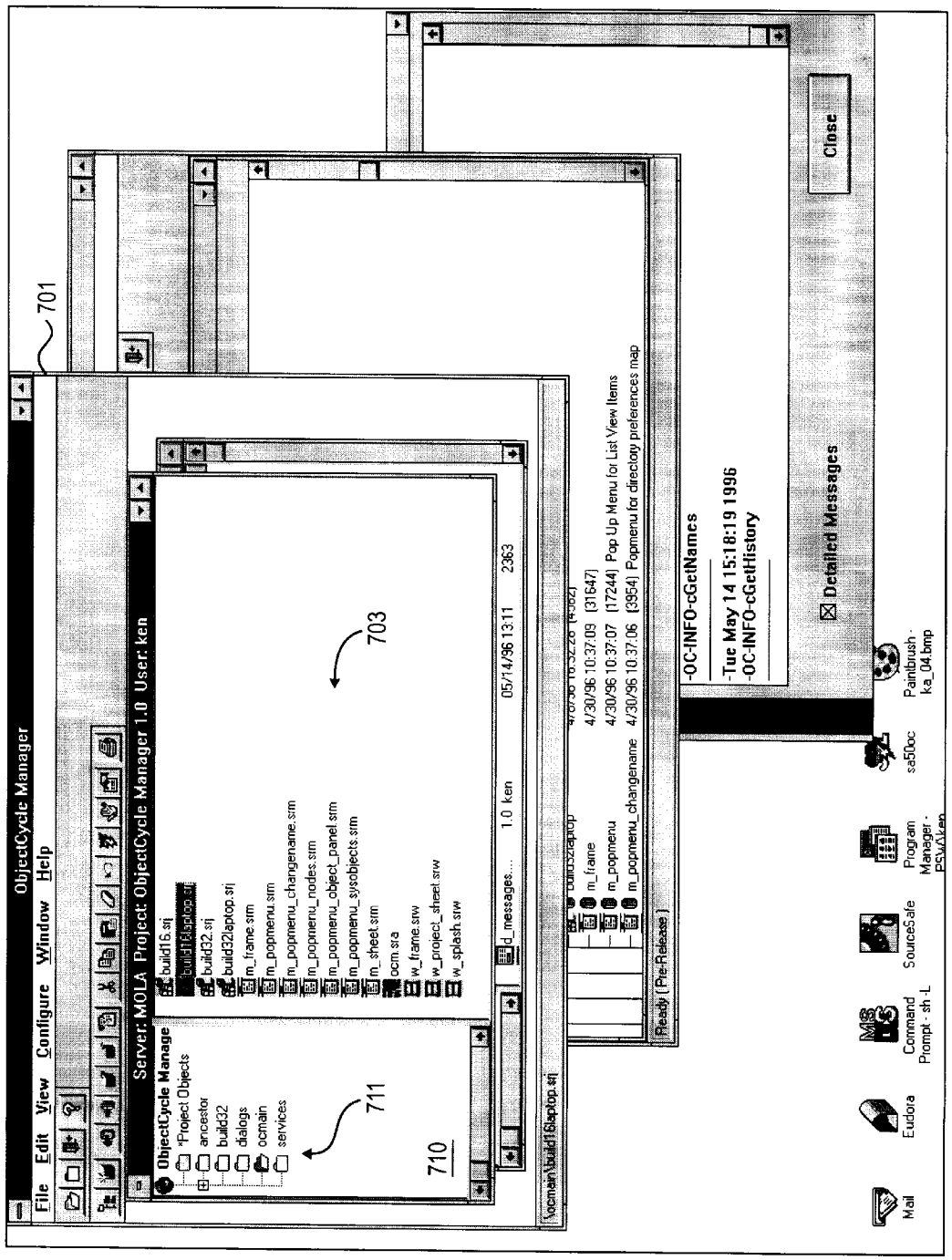
FIGS. 7A–B are bitmap screenshots illustrating use of the Object Cycle manager interface for viewing repository items and requesting actions on such items.

As illustrated in FIG. 6, the registration directory menu choice invokes an Object Cycle registration directory dialog 601. This, in effect, provides a browser to objects in the repository. Upon the user double clicking on an item, such as item 603, the system expands the item to show a list of versions, such as version list 605 shown for object 603. FIG. 7A illustrates the repository items now from the perspective of the Object Cycle manager interface, shown at 701. In particular, the manager interface shows a list of objects 703 which have been checked in. Specifically, the interface 701 displays project window 710, for a user-specified project. The user has arranged the project into different groups or folders, shown at 711. The user can open a particular folder by selecting it (e.g., clicking on it), whereupon the system displays the contents or items of a folder, such as shown at 703.

Figure 7B:
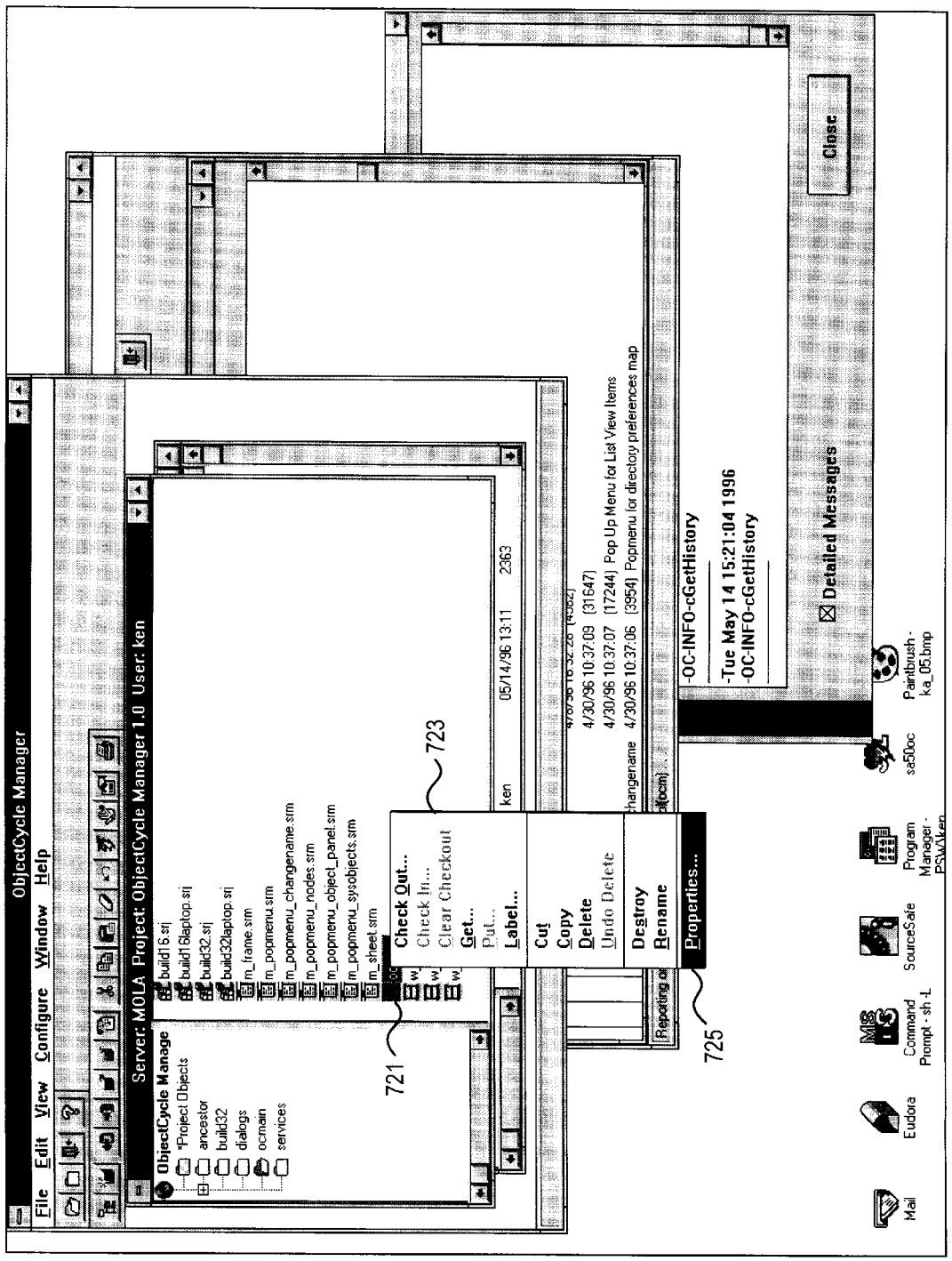
Figure 7C:
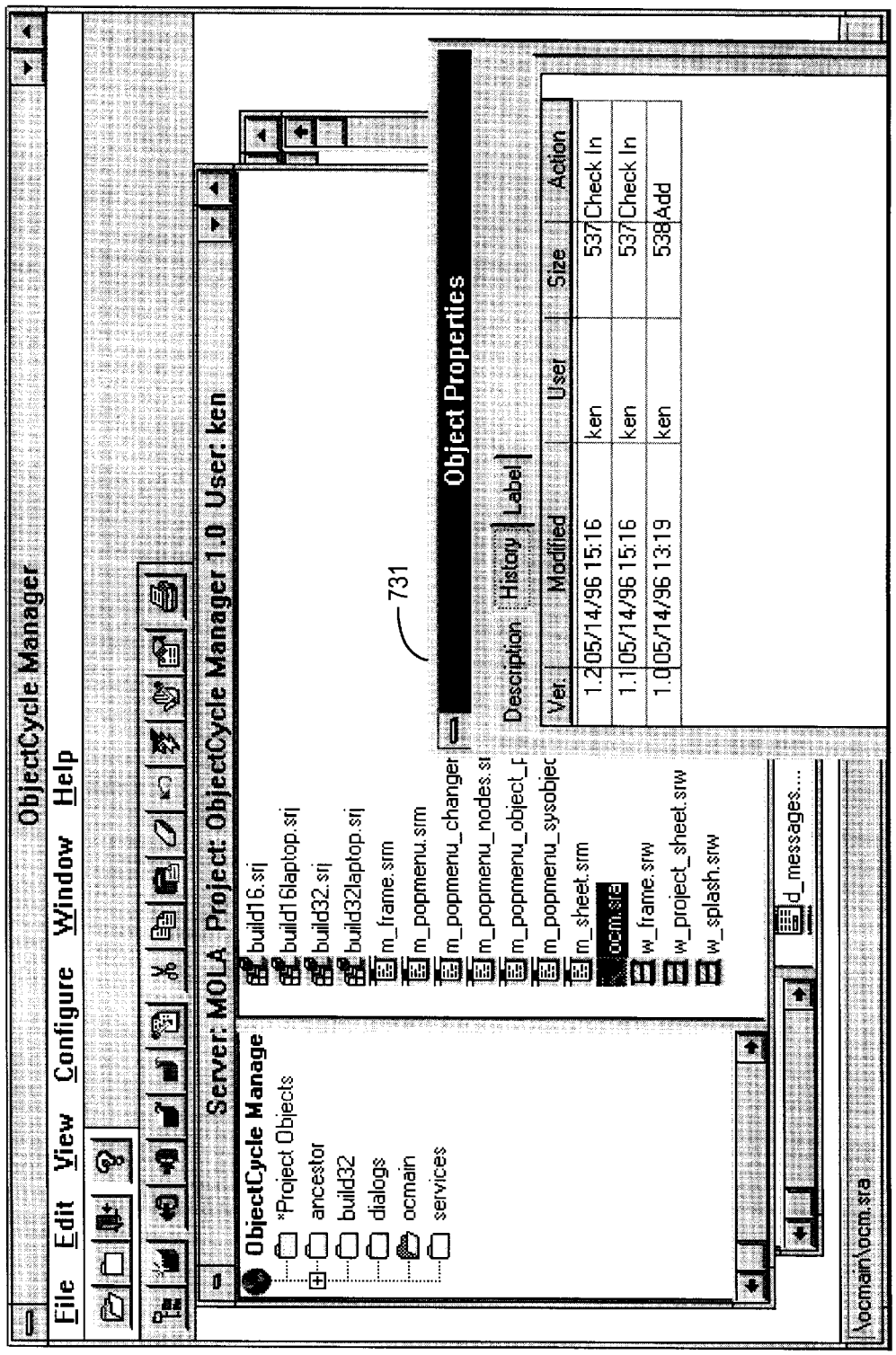
FIG. 7C is a bitmap screenshot illustrating use of the Object Cycle manager interface for changing properties of repository items.

As illustrated in FIG. 7B, the user can select (e.g., right click) individual objects for requesting actions (e.g., check out and check in) and properties specific to the object. As shown in FIG. 7B, for instance, selecting the object (node) 721 by the user invokes the pop up menu 723. From the pop up menu 723, the user can invoke specific actions for the object, or request inspection of the object's properties. Selecting "properties" choice 725, for example, invokes an object properties dialog 731 as shown in FIG. 7C. Here, the properties dialog 731 includes description, history, and label property panes, each listing specific property information for the selected object.

Additional description of the general operation of the Object Cycle versioning system of the present invention is appended herewith as Appendix A. Still further description is available in the on-line documentation accompanying Powersoft ObjectCycle™, available as Part No. HC0091 from Powersoft Corp., Concord, Mass., the disclosure of which is hereby incorporated by reference.

Internal Operation

A. Multi-layer Architecture

Figure 8:
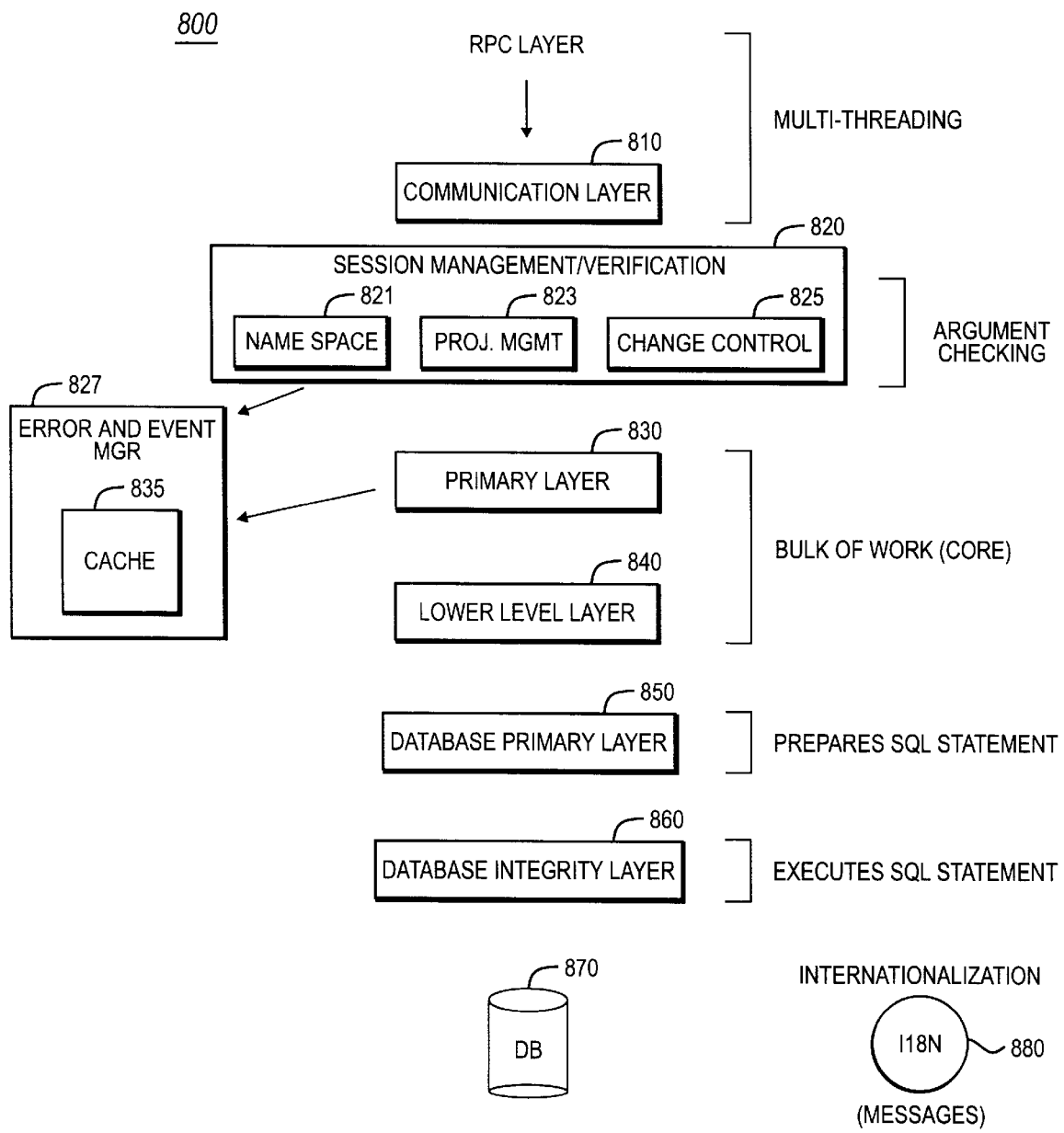
FIG. 8 is a block diagram illustrating a multi-layer architecture employed by a versioning engine of the system.

FIG. 8 illustrates the internal engine architecture 800 for a versioning system constructed in accordance with the present invention. Internally, the system is organized into separate layers of functionality. The layers comprise a communication layer 810, a session management/verification layer 820, a primary layer 830, a lower level layer 840, a database primary layer 850, and a database integrity layer 860. The validation layer 820, in turn, is subdivided into a name space module 821, a project management module 823, and a change control module 825. Each of these modules will now be described in further detail.

When a client invokes an API call (as illustrated in FIG. 2), the communication layer 810 traps the call. The communication layer 810, therefore, interfaces with the Remote Procedure Call (RPC) layer. Both the RPC layer and the communication layer 810 support multi-threading. A thread is spawned per client request. The methods of the various layers implemented in a thread-safe manner, so that a problem or error encountering with any particular request is isolated to that corresponding thread.

Underlying the communication layer 810 is the session management or "verification" layer 820. This layer is primarily responsible for argument checking and error tracking. Here, each API call is verified to ensure that its parameters or arguments are valid. As shown, the layer communicates with an error and event manager 827. The verification layer 820 is subdivided according to the type of API call being processed by the communication layer 810. The types include: name space 821, project management 823, and change control 825. Each will be described in turn.

The name space manager 821 provides support for those API calls which affect the name space, including "add entity," "add object," "add node," and other such name-space related API calls. The name space itself comprises the names of various objects (e.g., files, tables, folders, and the like), with the name space being represented internally as a plurality of nodes, each node representing a particular folder. Each node, in turn, can store one or more names. As a result of a change to the name space, a name space node will be added, deleted, or modified. The change control manager 825 handles version-related API calls, such as checking out and checking in versions, canceling a check out, and the like. The project management module 823 processes project-related requests, such as adding a project, deleting a project, adding a user to a project, changing the role of a user in a project, and the like.

The next layer in this multi-layer architecture is the primary layer 830. The primary layer 830 forms the core or workhorse layer for the engine; it performs the bulk of the work of version management. Depending on the particular API call being processed, the primary layer 830 may work in conjunction with lower level layer 840 or, alternatively, interact directly with the database primary layer 850. The lower level layer 840, on the other hand, typically includes methods which require the system to access data from the database 870. The routines of the primary layer 830 include ones which do not require data access. These routines manage status information stored in a hash table in a cache memory 835. The cache 835, which operates under the control of a cache manager, stores names status and other information (e.g., name space information), thereby affording quick access to such information in the system. Changes which affect this information are propagated to the cache 835, so that at all times the system maintains a consistent view.

The database primary layer 850 is invoked by both the primary layer 830 (for certain calls) and the lower level layer 840. The database primary layer 850 is responsible for preparing appropriate SQL statements for processing information from the database 870. Actual execution of each SQL statement is the responsibility of the database integrity layer 860.

In a preferred embodiment, localization (internationalization) information is maintained in a separate module, internationalization module 880. Any culturally-sensitive information (e.g., error messages in a particular language) are maintained by the internationalization module 880. In operation, the various layers retrieve messages from the module at runtime, as appropriate for the particular locale where the system is deployed.

B. Implementation of Meta Model Schema

Figure 9:
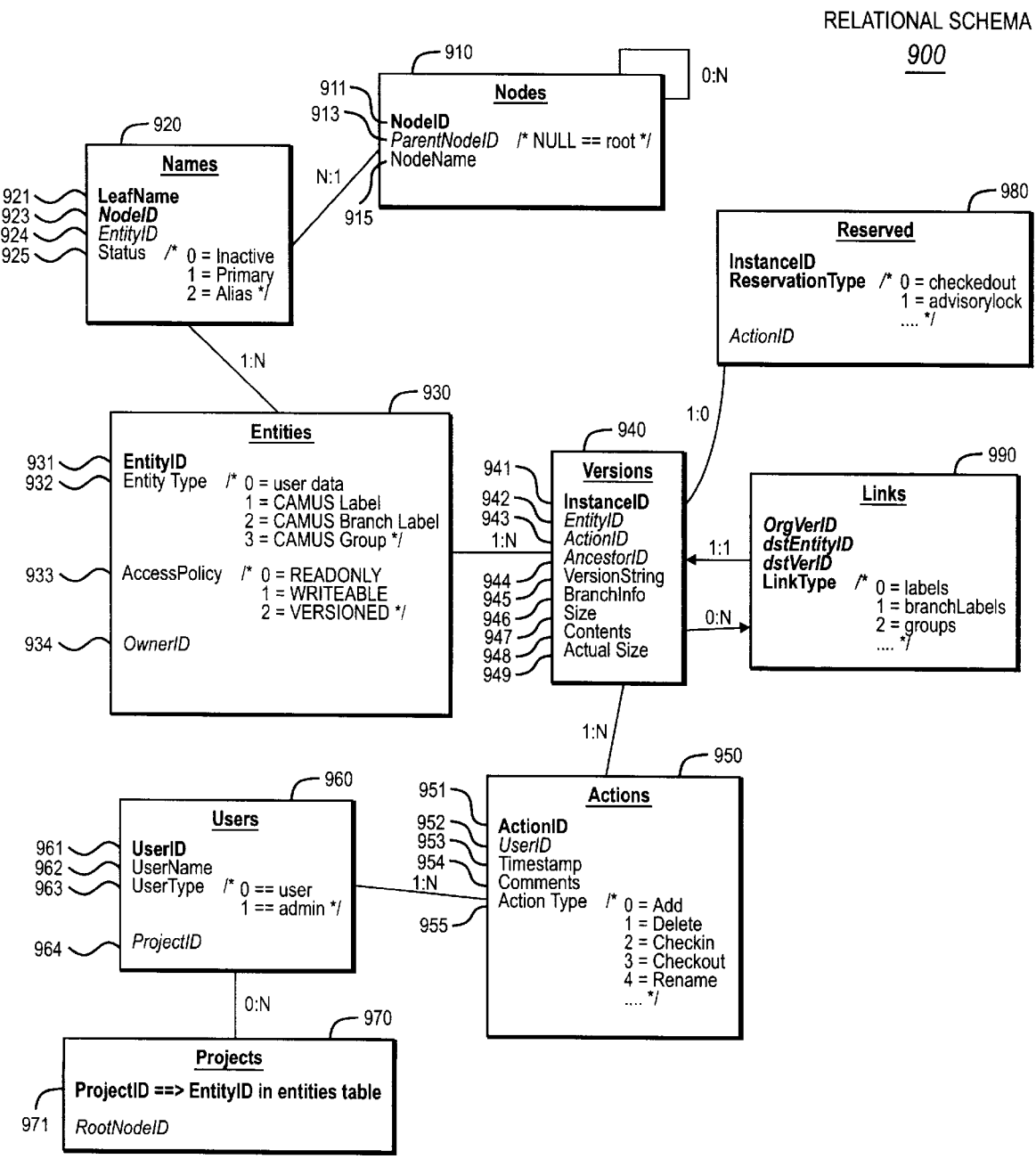
FIG. 9 is a block diagram illustrating a relational schema employed for internal storage and management of versioned objects in the system.

FIG. 9 illustrates a relational schema 900 representing internal storage and management of versioned objects in the system of the present invention. At a top level, the schema 900 includes a nodes table 910 for storing name space information. Each entry in the table is represented by a node ID 911, for uniquely identifying the node. In addition, each node includes an ID for its parent—that is, parent node ID 913. If the parent node ID indicates that the parent node is NULL, then the current node is the root node of the name space tree or hierarchy. Each node contains a name, node name 915, for representing an entity. Each node can reference multiple names, such as a primary name or an alias name. A name itself, on the other hand, cannot reference multiple nodes; instead, it must be uniquely associated with a particular node.

Name information itself is stored in names table 920, which maintains a N:1 relationship with the nodes table 910. As shown, each names entry in the names table 920 includes a leafname 921, a node ID 923, an entity ID 924, and status information 925. The linkage between the nodes table 910 and the names table 920 is via respective node ID fields (at 923 and 911).

The names table 920 is, in turn, related to the entities table 930. The entities table 930 is related to the names table 920 through the common entity ID fields (at 931 and 924). The entity ID itself comprises a unique identifier for each entity. The entities table 930 also stores a type, entity type 932, for characterizing each entity as user data, a label, a branch label, or a group. Additionally, the table maintains an access policy field 933, for indicating whether the entity is read-only, writeable, or versioned. The "owner" of the entity is specified by owner ID 934. This information indicates which user created the entity. Typically, owner ID 934 simply stores the user name of that user.

Version information about each entity is stored by versions table 940. As shown, the versions table 940 includes an entity ID 942 for linking each of its entries with corresponding ones of the entities table 930. Other fields of the versions table 940 include instance ID 941, action ID 943, ancestor ID 944, version string 945, branch info 946, size 947, contents 948, and actual size 949. The instance ID 941 uniquely identifies this instance or version of the entity, as distinguished from other versions of the same entity. Thus, the instance ID represents a version ID. The action ID 943 is employed for linking with actions table 950. Actions include checking out, checking in, adding, or deleting a version. The ancestor ID 944 stores the ID of the previous version of the entity (i.e., its immediate ancestor).

Figure 10A:
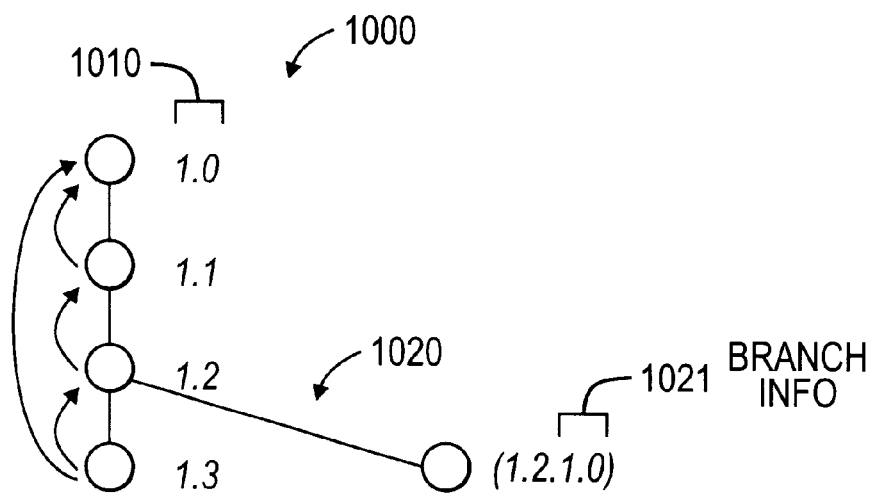
FIGS. 10A–B are diagrams illustrating use of hierarchical (linked) nodes for managing different versions of an object.

The version string, 945 stores a string describing a particular version, such as version 1.0, 1.1, 1.2, and the like. Version strings for a typical object are illustrated in FIG. 10A. For hierarchical nodes 1000 (representing different versions of an entity), corresponding version strings are shown at 1010. Suppose further that a branch version is created, as illustrated at 1020. Branch information, shown at 1021, is stored by the branch info field 946. The branch info, in particular, indicates a distance from the trunk. For the example indicated at 1020, the distance from the trunk (i.e., the branch info) is "1.0."

In addition to storing versioning information, the versions table 940 stores the actual object which comprises the version. Typically, the object is stored as a "blob" (binary large object) in the contents field 948. For managing each object, each entry in the versions table stores an actual size (uncompressed size) 949 for the object, as well as a size (compressed size) 947.

Figure 10B:
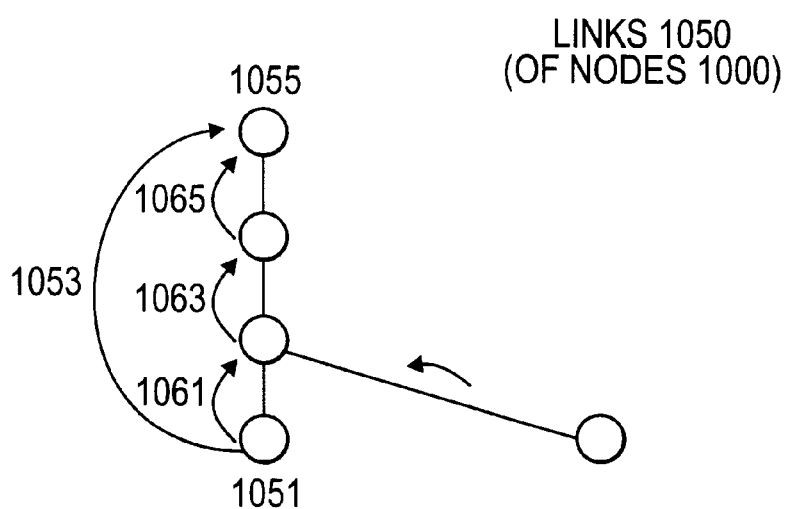

Each version is associated with a particular link, thus allowing the system to maintain a hierarchy of versions for an entity. As shown in FIG. 10B for links 1050 (of nodes 1000), the latest version 1051 includes a link 1053 to the base version 1055. Additionally, each version has a link to its previous version (if any), as indicated by links 1061, 1063, 1065. The link information itself is maintained in links table 990 in a form which describes where a link originates (original version or instance ID) and where it is going (destination version or instance ID). Just as there are different types of entities, different types of links are provided: labels, branch labels, and groups.

Actions table 950, which is linked to the versions table 940 (as previously described), include action ID 951, user ID 952, time stamp 953, comments 954, and action type 955. The action ID 951 is an identifier uniquely identifying a particular requested action. Each action is requested by a user, who is identified by user ID 952. The time when the action is requested is identified by time stamp 953. Any comments which the user provides at the time of requesting the action are stored by comments field 954. Finally, the actions table 950 stores information describing a type for the action (action type 955), which can include, for example, adding, deleting, check in, check out, renaming, and the like.

The actions table 950 is linked to users table 960, via the common user ID fields (at 961 and 952). Each entry in the users table 960 characterizes a particular user. Here, the table stores a user ID 961 for uniquely identifying the user. User name 962 stores a text string describing the user (as typically identified in a network configuration). User type 963 specifies the type of user, either "user" (i.e., regular user) or "administrator." Finally, the users table 960 is linked to projects table 970, via project ID fields (at 964 and 971). The project ID is actually simply an entry ID which indexes into the entries table 930.

For instances witch are checked out, the system employs the reserved table 980. Here, the system simply stores entries describing which particular versions or instances are checked out, together with a checked out or reservation type. In this manner, when a version is requested for check out, the system may first reference the reserved table 980, for determining whether the requested item is available.

C. Methods of Operation

1. Adding an Object

Figure 11:
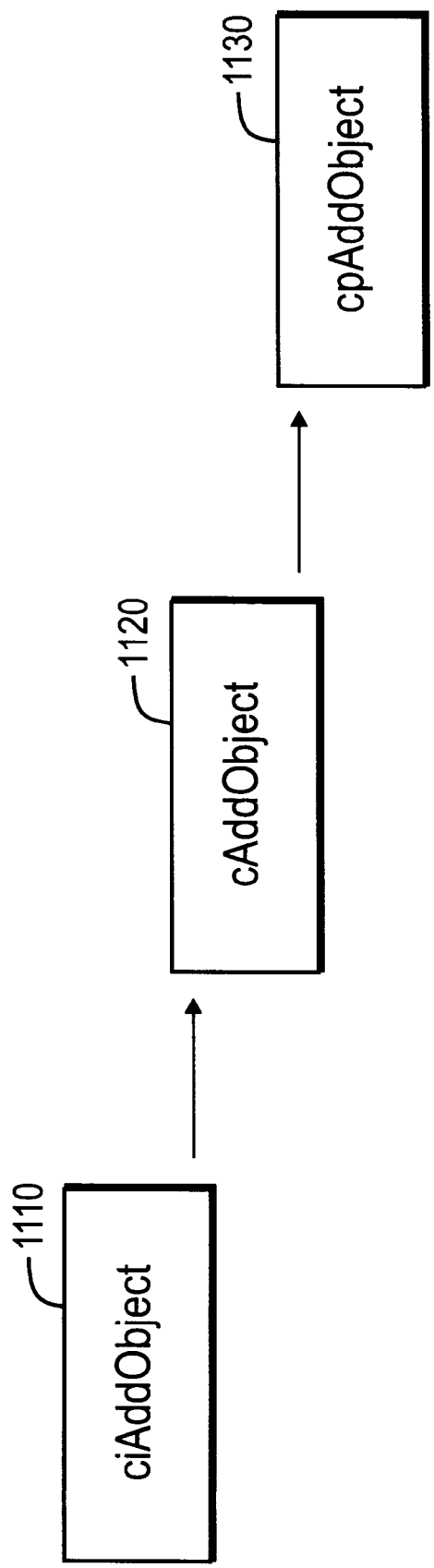
FIG. 11 is a block diagram illustrating an "Add Object" method of the present invention for adding objects to the repository.

FIG. 11 is a block diagram illustrating an "Add Object" method 1100 of the present invention for adding objects to the repository. As shown, the method invokes a ciAddObject (API) method call 1110, as an entry point into the method. That method call, in turn, invokes a cAddObject method call 1120. It, in turn, invokes a cpAddObject method call 1130. Each of these API calls will now be described in further detail.

The ciAddObject method call is invoked from the previously-described API/RPC interfaces 240 (from FIG. 2). The method call, therefore, represents a high-level API call visible to the interfaces 240. In an exemplary embodiment, the ciAddObject method may be constructed as follows (using the C programming language).

```
 1:  CAMUS_RC
 2:      ciAddObject( SESSIONHDL      sessionHdl
 3:                  , PiSZ            piszName
 4:                  , PiSZ            comments
 5:                  , cFORMAT         format
 6:                  , cACCESSPOLICY   policy
 7:                  , PcBLOB          pBlob
 8:                  , PiSZ            optionalOwner
 9:                  , LONG            flags
10:                  )
11: {
12:     CAMUS_RC    rc = CAMUS_SUCCESS;
13:         cBLOB       bufferedBlob = NULL_BLOB;
14:
15:         CamusTryExcept
16:         {
17:             /*
18:              * Check if the blob has been buffered
19:              */
20:             if( BLOB_IS_BUFFERED(pBlob) )
21:             {
22:                 rc = cGetBufferedBlob( sessionHdl, &bufferedBlob );
23:
24:                 if ( rc == CAMUS_SUCCESS )
25:                 {
26:                     CAMUS_ASSERT( bufferedBlob.size == pBlob->size );
27:                     pBlob->pContents = bufferedBlob.pContents;
28:                 }
29:             }
30:
31:             if ( rc == CAMUS_SUCCESS )
32:             {
33:                 rc = cAddObject( sessionHdl
34:                                 , piszName
35:                                 , comments
36:                                 , format
37:                                 , policy
38:                                 , pBlob
39:                                 , optionalOwner
40:                                 , flags
41:                                 ) ;
42:             }
43:
44:             /*
45:              * If our contents were really buffered here as opposed to
46:              * having come over the wire, we need to free it ourselves
47:              */
48:             if ( bufferedBlob.pContents != NULL )
49:                 cFree( bufferedBlob.pContents );
50:         }
51:         CamusExcept( CamusHandleException )
52:         {
```

-continued

```
53:            // Post Error Msg to error Mgr ( File & Screen )
54:                rc = camErrorRegisterMsgByKey( (PCCB) sessionHdl
55:                                             , cSERVER_EXCEPTION
56:                                             , NO_PREV_ERROR
57:                                             , ERR_INTERNAL
58:                                             , CamusExceptionCode
59:                                             , cpActionTypeToString( cADD )
60:                                             ) ;
61:             cpUnlockSession( sessionHdl );
62:         }
63:         CamusEndExcept
64:
65:         return( rc );
66: }
```

(line numbers added for clarity of the following description)

As shown, the method call is invoked with eight parameters. The first parameter, sessionHdl, is a session handle. This parameter references general session information; it is initialized upon the client first connecting to the system. More particularly, the session handle references a connection block characterizing a particular connection. The connection block may be represented by a connection block data structure as follows.

```
typedef struct __camusConnectionBlock
{
        CAMUSID                 userID;
        cUSERROLE               userRole;
        iUSERNAMEBUF            userNameBuf;
        CAMUSID                 currProjectID;
        CAMUSID                 currProjectVID;
        CAMUSID                 rootNodeID;
        CAMUSID                 currNodeID;
        CAMUSID                 projSystemNodeID;
        PSZ                     pszLanguage;
        cACTIONTYPE             currAction;
        time_t                  lastActionTime;
        CAMUS_CRITICAL_SECTION  userSync;
        CCBFLAGS                flags;
        PIDARRAY                pNodeIDArray;
}       CCB, *PCCB;
```

As shown, the first data member of the connection block is userID—an identifier or ID for the user. The second data member, userRole, represents a role for the user. The user role data member represents an enumerated type. In an exemplary embodiment, the following types are defined.

```
typedef enum __userRole
{
        cUSER           = 0x00001,
        cADMINISTRATOR  = 0x00011,
        cINACTIVE       = 0x00021,
        cMAXUSERROLE    = 0x00031
}       cUSERROLE;
```

For instance, the user may assume the role of "administrator." A user without administrative privileges, on the other hand, is simply a "user." The third data member of the connection block is userNameBuf. This references a buffer storing a text string of the user's name (e.g., "Ken").

The next several data members store various IDs. The first one, currProjectID, stores an ID for the current project. The next data member, currProjectVID, stores a version ID for the project, for supporting multiple versions of a given project. The rootNodeID data member stores an ID for the root node, for identifying a particular root directory (disk subdirectory) for the project. In a corresponding manner, the currNodeID data member identifies a current object which exists within the project hierarchy. The projSystemNodeID data member stores an identifier for a system node, for storing system objects (e.g., labels or aliases for objects). The pszLanguage data member stores a string indicating a current language employed by the system. In a default setting, the system stores "English" for this data member. This information is then employed at runtime for appropriate handling of locale-specific information. The currAction data member stores information describing the current action undertaken by the user (e.g., AddObject). Time stamp information for user actions is stored by the lastActionTime data member. The userSync data member maintains synchronization information, for permitting the system to operate in a multi-user environment. The flaps data member stores miscellaneous flags or housekeeping data. Finally, the pNodeIDArray data member references an array storing node IDs, for indicating the current path in the project hierarchy or tree (from the root node to the current node).

Returning to the description of the parameters passed to the ciAddObject method, the second parameter, piszName, stores a name for the object to be added (e.g., "myfile.cpp"). In a similar manner, the comments parameter stores a string comprising user-supplied comments for the object to be stored. The format parameter specifies a format, such as text or binary, for the object to be stored. These and other types may be defined as follows.

```
/*
 * Object format
 */
typedef enum __objectFormat
{
        cTEXT           = 0x0000,
        cBINARY         = 0x0001,
        cMAX_FORMAT     = 0x0002
}       cFORMAT;
```

The policy data member describes an access policy for the object to be stored. For instance, a policy of read-only, writeable, or versioned may be defined as follows.

```
/*
 * Object access policy
 *
```

-continued

```
* READONLY    Once added, object may not be overwritten
* WRITEABLE   Object may be overwritten by cPutObject()
* VERSIONED   Object must be checked in and out to be modified
*/
typedef enum __accessPolicy
{
    cREADONLY    = 0x0000,
    cWRITEABLE   = 0x0001,
    cVERSIONED   = 0x0002,
    cMAX_POLICY  = 0x0003
} cACCESSPOLICY;
```

The sixth parameter of ciAddObject, pBlob, comprises a pointer to a cBlob data structure defined as follows.

```
                        /* size is 8 */
typedef struct __cBlob
    {
    cSIZE size;
    /* [size_is] [length_is] */ PcCONTENTS pContents;
    } cBLOB;
```

```
                        /* size is 4 */
typedef struct __cBlob __RPC_FAR *PcBLOB;
```

The pBlob pointer, therefore, references a blob record storing a size for the object-to-be-stored together with the actual contents of that object.

The optionalOwner data member comprises a text string specifying an owner for the object being added. By default (i.e., if another user is not specified), the current user is the owner. Finally, the flags parameter serves to store miscellaneous flags or housekeeping information.

After initializing local variables at lines 12–13, the method checks whether the blob (actual object) has been buffered, at lines 17–29. In the event that the blob is correctly buffered, tested at line 31, the method calls on to the cAddObject method call, at lines 33–41. In essence, the ciAddObject call exists in a high-level layer. After it has validated parameter or argument information, it calls onto a lower-level layer, as illustrated by the call to cAddObject which resides in the next layer.

The cAddObject method itself may be implemented as follows.

```
 1:  /*
 2:   * cAddObject()
 3:   *
 4:   * Add an object in the current node and project.
 5:   *
 6:   */
 7:      CAMUSAPI cAddObject( SESSIONHDL     sessionHdl
 8:                         , PiSZ           piszName
 9:                         , PiSZ           pComments
10:                         , cFORMAT        format
11:                         , cACCESSPOLICY  policy
12:                         , PcBLOB         pBlob
13:                         , PiSZ           piszOptionalOwner
14:                         , LONG           flags
15:                         )
16:  {
17:      CAMUS_RC   rc;
18:      PCCB       pccb;
19:      CAMUSID    ownerID = NULL_CAMUSID;
20:
21:      // Log event
22:      CAMUS_MESSAGE( cpActionTypeToString( cADD ) );
23:
24:      // Lock session
25:      rc = cpLockSession( sessionHdl, &pccb, FALSE );
26:      if ( rc != CAMUS_SUCCESS )
27:      {
28:          return( rc );
29:      }
30:
31:      /*
32:       * We have a valid session handle; validate arguments
33:       */
34:      while( TRUE )
35:      {
36:          /*
37:           * Check action, blob name, blob, format,
38:           * policy, and optional owner
39:           */
40:
41:          if ( !VALID_ACTION( pccb, cADD ) )
42:          {
43:              rc = ACTION_ERROR;
```

-continued

```
 44:            break;
 45:        }
 46:        if ( !VALID_NAME( piszName ) )
 47:        {
 48:            rc = NAME_ERROR( MAX_NAMELEN );
 49:            break;
 50:        }
 51:        /*  Only simple names within the current node
 52:            are currently allowed */
 53:        if   ( !VALID_SIMPLE_NAME( piszName ))
 54:        {
 55:            rc = camInfoRegisterMsgByKey( pccb
 56:                                        , cARG_BAD_SIMPLE_NAME
 57:                                        , NO_PREV_ERROR
 58:                                        , ERR_ARG_BAD_CAMUS_NAME
 59:                                        ) ;
 60:            break;
 61:        }
 62:        if ( !pBlob || ! (pBlob->pContents) )
 63:        {
 64:            rc = camInfoRegisterMsgByKey( pccb
 65:                                        , cARG_BAD_BLOB
 66:                                        , NO_PREV_ERROR
 67:                                        , ERR_ARG_BAD_ARGUMENT
 68:                                        ) ;
 69:            break;
 70:        }
 71:        if ( !VALID_FORMAT( format ))
 72:        {
 73:            rc = camInfoRegisterMsgByKey( pccb
 74:                                        , cARG_BAD_FORMAT
 75:                                        , NO_PREV_ERROR
 76:                                        , ERR_ARG_BAD_ARGUMENT
 77:                                        ) ;
 78:            break;
 79:        }
 80:        if ( !VALID_POLICY( policy ))
 81:        {
 82:            rc = camInfoRegisterMsgByKey( pccb
 83:                                        , cARG_BAD_POLICY
 84:                                        , NO_PREV_ERROR
 85:                                        , ERR_ARG_BAD_ARGUMENT
 86:                                        ) ;
 87:            break;
 88:        }
 89:        if ( piszOptionalOwner )
 90:        {
 91:            if ( VALID_USER_NAME( piszOptionalOwner ) )
 92:            {
 93:               rc = clGetUserIDByName( pccb,
 94:                   piszOptionalOwner, &ownerID );
 95:            }
 96:            else
 97:            {
 98:               rc = camInfoRegisterMsgByKey( pccb
 99:                                           , cARG_BAD_USER_NAME
100:                                           , rc
101:                                           , ERR_ARG_BAD_USER_NAME
102:                                           , MAX_USER_NAMELEN
103:                                           ) ;
104:            }
105:
106:            if ( rc != CAMUS_SUCCESS ) break;
107:        }
108:        // Call onto cpAddObject (workhorse method)
109:        rc = cpAddObject( pccb
110:                        , piszName
111:                        , pComments
112:                        , format
113:                        , policy
114:                        , cUSER_DATA
115:                        , cACTIVE_NAME
116:                        , pBlob
117:                        , NULL_CAMUSID
118:                        , ownerID
119:                        , NULL_CAMUSID );
120:
121:        /*
122:         * XXX turn around and check this blob out to the
```

```
123:            *       user (or owner?) if flag is set
124:            */
125:            break;
126:        }
127:
128:        cpUnlockSession( sessionHdl );
129:        return( rc );
130:  }
```

As shown, the parameters to the ciAddObject method call are passed to the cAddObject method call. After declaring local variables at lines 17–19, the method logs an "add" event, at lines 21–22. At lines 24–29, the method locks a session, for obtaining access to shared data structures. If a lock cannot be obtained successfully (tested at line 26), the method returns at line 28. Otherwise, the session handle has been validated and the method may now proceed to validate arguments.

At lines 31–126, the method establishes a loop for checking the arguments; specifically, it validates the passed-in action, blob name, blob (data), format, policy, and optional owner. If an error occurs, a return or result condition variable, rc, is set to the value for the error code. After the arguments have been tested and validated, the method calls on to the cpAddObject method, at lines 109–119.

The cpAddObject method is the workhorse routine for adding an object to the repository. In an exemplary embodiment, the method may be constructed as follows.

```
 1:   /*
 2:    * cpAddObject()
 3:    *
 4:    */
 5:   CAMUSAPI cpAddObject( PCCB              pccb
 6:                       , PiSZ              piszName
 7:                       , PiSZ              piszComments
 8:                       , cFORMAT           format
 9:                       , cACCESSPOLICY     policy
10:                       , cOBJECTTYPE       type
11:                       , cNAMESTATUS       nameStatus
12:                       , PcBLOB            pBlob
13:                       , CAMUSID           optionalNodeID
14:                       , CAMUSID           optionalOwnerID
15:                       , CAMUSID           optionalProjectVID
16:                       )
17:   {
18:        CAMUS_RC       rc;
19:        PDSCONN        pDSConn;
20:        CAMUSID        entityID;
21:        CAMUSID        actionID;
22:        VERSRECORD     versRec = { 0 };
23:        CAMUSID        ownerID = (optionalOwnerID == NULL_CAMUSID)
24:                                    ? pccb->userID
25:                                    : optionalOwnerID;
26:
27:        if (CAMUS_SUCCESS != (rc = dsGetConnection( pccb
28:                                                  , &pDSConn
29:                                                  , ISOLATION_0 )))
30:        {
31:             return( rc );
32:        }
33:
34:        /*
35:         * Ok, to add an entity, we do the following:
36:         *
37:         *   1. Add the entity record
38:         *   2. Add the name record in the current node
39:         *   3. Add an action record
40:         *   4. Add the first version record; this process
41:         *      will also update appropriate project currency
42:         *      and base links within the version "tree"
43:         *   5. If all that succeeds, we update the name cache
44:         *      and then commit these db operations; otherwise
45:         *      we rollback the whole mess.
46:         */
47:        while( TRUE )
48:        {
49:             rc = dbpAddEntity( pccb
50:                              , pDSConn
```

-continued

```
 51:                    , format
 52:                    , type
 53:                    , policy
 54:                    , ownerID
 55:                    , &entityID );
 56:
 57:         if ( rc != CAMUS_SUCCESS ) break;
 58:
 59:         rc = dbpAddName( pccb
 60:                    , pDSConn
 61:                    , piszName
 62:                    , optionalNodeID
 63:                           == NULL_CAMUSID ? pccb->currNodeID
 64:                                           : optionalNodeID
 65:                    , entityID
 66:                    , nameStatus );
 67:
 68:         if ( rc != CAMUS_SUCCESS ) break;
 69:
 70:         rc = dbpAddAction( pccb
 71:                    , pDSConn
 72:                    , piszComments
 73:                    , &actionID );
 74:
 75:         if ( rc != CAMUS_SUCCESS ) break;
 76:
 77:         /*
 78:          * Add the first version of this guy into the
 79:          * appropriate project;
 80:          * by default, we start a trunk version with
 81:          * a revision of 0
 82:          */
 83:         versRec.entityID          = entityID;
 84:         versRec.actionID          = actionID;
 85:         versRec.ancestorVID       = NULL_CAMUSID;
 86:         versRec.versDesc.major    = 1;
 87:         versRec.versDesc.distance = 0;
 88:         versRec.versDesc.revision = 0;
 89:
 90:         rc = dbpAddVersion ( pccb
 91:                          , pDSConn
 92:                          , &versRec
 93:                          , optionalProjectVID
 94:                          , pBlob );
 95:
 96:         if ( rc != CAMUS_SUCCESS ) break;
 97:
 98:         /*
 99:          * Update cache last!
100:          */
101:         rc = nsAddName( pccb
102:                     , piszName
103:                     , entityID
104:                     , clEntityTypeToNameType( type )
105:                     , nameStatus
106:                     , optionalNodeID );
107:         break;
108:      }
109:
110:      if ( rc == CAMUS_SUCCESS )
111:      {
112:          CAMUS_SUCCESS == dsCommitTran( pccb, pDSConn );
113:      }
114:      else
115:      {
116:          CAMUS_SUCCESS == dsRollbackTran( pccb, pDSConn );
117:      }
118:
119:      CAMUS_SUCCESS == dsReturnConnection( pDSConn );
120:      return( rc );
121: }
```

The method is invoked with the previously-described parameters, together with additional parameters for specifying status and ID information. After declaring local variables, at lines 18–25, the method establishes a connection, at lines 27–29. If a connection cannot be successfully obtained (as tested at line 27), the method returns at line 31. If the method has not terminated, it is ready to add an entity to the repository.

The specific method steps for adding the entity are as follows. At lines 49–55, the method adds an "entity" record to the repository, specifying, for instance, the format, type, policy, owner ID, and entity ID for the object. A name record for the current node is then added, at lines 59–66. An action record is added at lines 70–73. A version record is added at lines 90–94; completion of individual version fields is shown at lines 83–88. If the method has been successful in adding these records (i.e., entity record, name record, action record, and version record), then it updates the name cache (cache 835 from FIG. 8) at lines 98–108 and commits the transaction at line 112. Otherwise (i.e., the return code is not equal to "success" at line 110), the method rolls back the transaction, as shown at line 116. To conclude the method, the connection is dropped or returned at line 119, and the return or result code is returned to the caller, at line 120.

The calls to add the various records (i.e., the dbp- calls at line 49, 59, 70, and 90) invoke the database primary layer (layer 850 in FIG. 8). The dbpAddEntity, which serves to add an entry in the entity table, may be constructed as follows.

```
 1: /*
 2:  * dbpAddEntity()
 3:  *
 4:  * Add an entry in the entity table
 5:  */
 6:      CAMUSAPI dbpAddEntity( PCCB            pccb
 7:                           , PDSCONN         pDSConn
 8:                           , cFORMAT         format
 9:                           , cOBJECTTYPE     type
10:                           , cACCESSPOLICY   policy
11:                           , CAMUSID         ownerID
12:                           , CAMUSID         *pEntityID
13:                           )
14: {
15:      CHAR        cmdBuf[ CMDBUFLEN ],
16:                  valuesBuf[ VALUESBUFLEN ];
17:      LONG        dupkeyRetries = 0;
18:      CAMUS_RC    rc;
19:
20:      *pEntityID = newCamusID();
21:
22:      // Prepare SQL statement
23:
24:      sprintf( valuesBuf
25:             , "%ld, %d, %d, %d, %ld"
26:             , *pEntityID
27:             , format
28:             , type
29:             , policy
30:             , ownerID
31:             ) ;
32:      sprintf( cmdBuf
33:             , INSERT_CMD
34:             , ENTITIES_TABLE
35:             , valuesBuf
36:             ) ;
37:
38:      while( dupkeyRetries++ < DUPKEY_RETRY_LIMIT )
39:      {
40:          // Execute SQL Statement
41:          rc = dsExecuteCmd( pccb
42:                           , pDSConn
43:                           , cmdBuf
44:                           , NULL
45:                           , NULL
46:                           , NULL
47:                           , NULL
48:                           ) ;
49:
50:          if ( GET_ERROR_CODE( rc ) == ERR_DS_DUPKEY )
51:          {
52:              CAMUS_TRACE("Duplicate key hit; retrying...");
53:              CAMUS_ASSERT( CAMUS_SUCCESS == camErrorClear( pccb, rc ));
54:              (*pEntityID) += (CAMUSID) rand();
55:              sprintf( valuesBuf
56:                     , "%ld, %d, %d, %d, %ld"
57:                     , *pEntityID
58:                     , format
59:                     , type
60:                     , policy
61:                     , ownerID
62:                     ) ;
63:              sprintf( cmdBuf
64:                     , INSERT_CMD
65:                     , ENTITIES_TABLE
```

```
66:                       , valuesBuf
67:                       ) ;
68:
69:              continue;
70:          }
71:
72:          break;
73:      }
74:
75:      return( rc );
76: }
```

After declaring local variables at lines 15–18, the method initializes an identifier or ID for the entity record, at line 20. Now, the method may undertake preparation of an appropriate SQL statement. At lines 24–31, the method constructs a string (valuesBuj) which stores the entity ID, format, type, policy, and owner ID for the entity to be added. Next, the method constructs a command string (cmdBuf) which adds to the above-constructed string a SQL command (here, "INSERT" ), together with the name of the table to insert into (here, "ENTITIES_TABLE" ).

After the SQL statement has been constructed, the method is now ready to submit the statement for execution. This is shown at lines 38–73. Specifically, the SQL statement (command buffer or cmdBuf) is passed, together with a (pointer to) connection descriptor, to the dsExecuteCmd routine, as shown at lines 41–48. This call performs the actual insertion of the entities record. Upon completion of the call, a return or result code (rc) is returned, for reporting the success of the operation. Error processing (e.g., attempting to insert a duplicate key value) is handled at lines 50–70. The method will generate a new entity ID for each repeat attempt. After successful completion of insertion of the record or after reaching a "retry limit," the method proceeds to line 75 to return the result code. Here, the method returns to the caller, the cpAddObject method. It, in turn, will return to its caller and so forth and so on until control is; ultimately returned to the ciAddObject method. After performing housekeeping and cleanup steps, the ciAddObject method concludes by returning a result code to its caller, for indicating the success of adding the object.

2. Checking Out an Object

Figure 12:
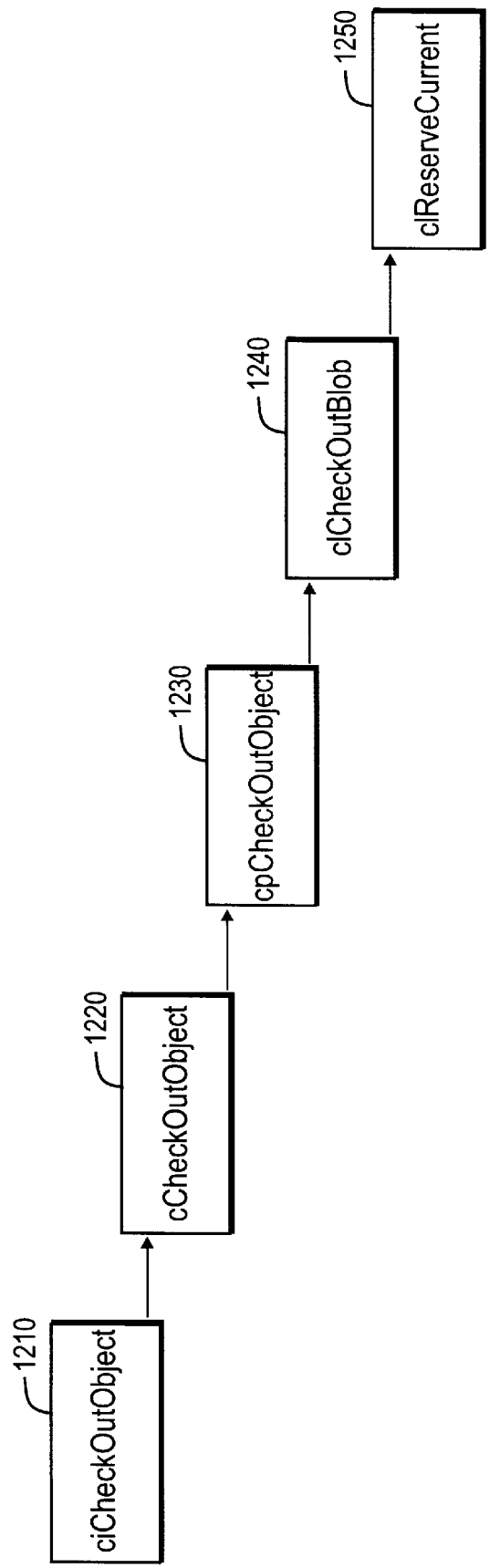
FIG. 12 is a block diagram illustrating a "Checkout Object" method of the present invention for checking out objects from the repository.

A request by a client to check out an object is first received by the communication layer 810, shown previously in FIG. 8. It, in turn, passes the request to the change control manager or module 825, for changing control. The change control manager 825 validates the arguments and then passes the request to the primary layer 830. After examining entity information about the object from cache 835, the primary layer 830 will invoke the database primary layer 850 for preparing an SQL statement which requests the object. The prepared SQL statement is, in turn, executed by the database integrity layer 860. This selects the appropriate object from the database table 870. As shown in FIG. 12, this operation—"Checkout Object" method 1200—may be implemented as a specific sequence of method calls for checking out an object: ciCheckOutObject 1210 calls ciCheckOutObject 1220 which, in turn, calls cpCheckOutObject 1230 which, in turn, calls ciCheckOutBlob 1240 which, in turn, calls ciReserveCurrent 1250. Implementation of these methods will now be described in further detail.

As illustrated, the ciCheckOutObject method is the main entry point for checking out objects. In an exemplary embodiment, the method may be constructed as follows.

```
1:  // Checkout Object
2:
3:  CAMUS_RC
4:     ciCheckOutObject( SESSIONHDL  sessionHdl
5:                      , PiSZ        piszName
6:                      , PcBLOB      pBlob
7:                      , ULONG       maxBytes
8:                      )
9:  {
10:     CAMUS_RC      rc;
11:
12:     CamusTryExcept
13:     {
14:         rc = cCheckOutObject( sessionHdl
15:                             , piszName
16:                             , pBlob
17:                             ) ;
18:
19:         /*
20:          * Do we need to buffer this blob for the client ?
21:          */
22:         if ( rc == CAMUS_SUCCESS && (BUFFER_BLOB(pBlob, maxBytes)) )
23:         {
24:             rc = cBufferBlob( sessionHdl
25:                             , maxBytes
26:                             , pBlob->size
27:                             , pBlob->pContents
```

-continued

```
28:                      , cBUFFER_FOR_READ );
29:
30:            /* Alert client that we've buffered the blob for him/her to
31:             * come get in chunks by nulling the contents but leaving the
32:             * size
33:             */
34:            pBlob->pContents = NULL;
35:        }
36:    }
37:    CamusExcept( CamusHandleException )
38:    {
39:        rc = camErrorRegisterMsgByKey( (PCCB) sessionHdl
40:                                     , cSERVER_EXCEPTION
41:                                     , NO_PREV_ERROR
42:                                     , ERR_INTERNAL
43:                                     , CamusExceptionCode
44:                                     , cpActionTypeToString( cCHECKOUT
45:                                     ) ;
46:        cpUnlockSession( sessionHdl );
47:    }
48:    CamusEndExcept
49:
50:    return( rc );
51: }
```

The method is invoked with four arguments or parameters. The first parameter, sessionHdl, is a session handle—that is, a data member referencing descriptor information for the current session. The next three parameters characterize the object to check out. The piszName parameter, for instance, stores a string comprising a text name for the object. The third parameter., pBlob, comprises a pointer to a memory location for receiving the object (which is to be received as a binary large object or blob). The final parameter, maxBytes, stores the size (byte count) for the object.

After initializing a local variable at line 10, the method invokes the cCheckOutObject method, at lines 14–17. Here, cCheckOutObject is invoked with the above-described session handle (sessionHdl), name (piszName), and pointer to blob (pBlob). At line 22, the method tests whether it needs to buffer the blob for the client (such as a client limited to 64K memory blocks); this is done only if the call to check out the blob was successful. The specific call to buffer the blob, cBufferBlob, occurs at lines 24–28. By setting the contents of the blob to NULL, the method marks the blob as one which has been buffered for the client.

At line 44, the method registers an action type of "checkout" by calling the method cpActionTypeToString. This method call is itself nested within an error registration method, camErrorRegisterMsgByKey, as set forth beginning at line 39. Upon completion of posting the action string, the method can unlock the session (shown at line 46) and return the result to its caller, as shown at line 50.

The cCheckOutObject method call will now be described in further detail. In an exemplary embodiment, the method may be constructed as follows.

```
1:  /*
2:   * cCheckOutObject ()
3:   *
4:   * Reserve and get a blob for the user
5:   */
6:     CAMUSAPI cCheckOutObject( SESSIONHDL sessionHdl
7:                             , PiSZ       piszName
8:                             , PcBLOB     pBlob
9:                             )
10: {
11:     CAMUS_RC   rc;
12:     PCCB       pccb;
13:
14:     // Post aa action msg
15:     CAMUS_MESSAGE( cpActionTypeToString( cCHECKOUT ) );
16:
17:     rc = cpLockSession( sessionHdl, &pccb, FALSE );
18:     if ( rc != CAMUS_SUCCESS )
19:     {
20:         return( rc );
21:     }
22:
23:     /*
24:      * We have a valid session handle; validate arguments
25:      */
26:     while( TRUE )
27:     {
28:         /*
```

```
29:        * Check action, blob name
30:        */
31:       if ( !VALID_ACTION( pccb, cCHECKOUT ) )
32:       {
33:           rc = ACTION_ERROR;
34:           break;
35:       }
36:       if ( !VALID_FULLNAME( piszName ) )
37:       {
38:           rc = NAME_ERROR( MAX_FULL_NAMELEN );
39:           break;
40:       }
41:       if ( !pBlob )
42:       {
43:           rc = camInfoRegisterMsgByKey( pccb
44:                                       , cARG_BAD_BLOB
45:                                       , NO_PREV_ERROR
46:                                       , ERR_ARG_BAD_ARGUMENT
47:                                       ) ;
48:           break;
49:       }
50:
51:       rc = cpCheckOutObject( pccb, piszName, pBlob );
52:
53:       break;
54:   }
55:
56:   cpUnlockSession( sessionHdl );
57:   return( rc );
58: }
```

After initializing local variables at lines 11–12, the method posts a "CHECKOUT" action string at line 15. Next, at line 17, the method asserts a session lock, for protecting shared data structures. In the event that a lock cannot be successfully asserted, the method returns at line 20. Otherwise, a valid session handle exists and the method may proceed to validate arguments, as indicated by lines 23–54. The steps for validation are as follows. At lines 28–35, the method validates the action (i.e., "CHECKOUT"). At lines 36–40, the method validates the passed-in name. At lines 41–49, the method validates the blob.

If all of these validations had been successfully completed, the method may, in turn, invoke the cpCheckOutObject method call, as shown at line 51. The cpCheckOutObject method call serves to resolve the object name (into an identifiable object which may be checked out). After the call completes, the cCheckOutObject method unlocks the session at line 56 and then returns the result code at line 57.

The cpCheckOutObject method itself may be constructed as follows.

```
1: /*
2:  * cpCheckOutObject()
3:  *
4:  * Resolve the name and invoke the camlow checkout function to
5:  * do the work
6:  */
7:    CAMUSAPI cpCheckOutObject( PCCB       pccb
8:                             , PiSZ       piszName
9:                             , PcBLOB     pBlob
10:                            )
11: {
12:      CAMUS_RC    rc;
13:      CAMUSID     entityID;
14:
15:      /*
16:       * Resolve this name down to an entity ID
17:       * Fills the entityID and gives us back.
18:       */
19:       if (CAMUS_SUCCESS != (rc = nsResolveActiveName( pccb
20:                                                     , piszName
21:                                                     , NULL_CAMUSID
22:                                                     , &entityID )))
23:       {
24:            return( rc );
```

```
25:        }
26:
27:        return( clCheckOutBlob( pccb, entityID, pBlob ) );
28: }
```

The method essentially serves as a wrapper to another method, nsResolveActiveName, which is invoked at lines 19–22. Based on the passed-in name (piszName), the nsResolveActiveName method call returns an entity ID (by writing to the entity ID parameter which is passed by reference). If the name cannot be successfully resolved, the method will return an error code at line 24. Otherwise, the method proceeds to line 27 to call a lower-level routine, clCheckOutBlob.

The clCheckOutBlob method itself may, in turn, be implemented as follows.

```
 1:   /*
 2:    * clCheckOutBlob()
 3:    *
 4:    * This routine does most of the work in reserving and retrieving
 5:    * a blob; first attempt to reserve it and then commit the
 6:    * reservation if it succeeds; then go about the business of
 7:    * getting the blob
 8:    */
 9:       CAMUSAPI clCheckOutBlob( PCCB        pccb
10:                              , CAMUSID     entityID
11:                              , PcBLOB      pBlob
12:                              )
13:   {
14:        CAMUS_RC      rc;
15:        PDSCONN       pDSConn;
16:        ENTITYINFO    entityInfo = { 0 };
17:        VERSRECORD    versRec = { 0 };
18:
19:        /*
20:         * This ISO level will leave a read lock on the current
21:         * version link until we've committed or rolled back; we
22:         * don't need the extra phantom protection (ISO 3 ) here,
23:         * though. (Of course, realistically, the only processes
24:         * that might bump that current version pointer would be
25:         * checkin, which wouldn't get far anyway because this
26:         * guy isn't checked out yet. So we're sort of inherently
27:         * safe because of the co/ci protocol. Maybe we can put
28:         * this back to ISO 1 if throughput becomes an issue...?
29:         */
30:        if (CAMUS_SUCCESS != (rc = dsGetConnection( pccb
31:                                                  , &pDSConn
32:                                                  , ISOLATION_2 )))
33:        {
34:            return( rc );
35:        }
36:
37:        /*
38:         * To reserve a version, validate that the policy is
39:         * VERSIONED (we should probably do this up in cpCheckOutBlob()
40:         * but we don't have a ds connection there...although maybe
41:         * we should.. ), then we have to add an action, determine
42:         * the current version, then reserve it
43:         */
44:        while( TRUE )
45:        {
46:            /*
47:             * Validate that the access policy is VERSIONED
48:             */
49:             if (CAMUS_SUCCESS != (rc = dbpGetEntityInfo( pccb
50:                                                        , pDSConn
51:                                                        , entityID
52:                                                        , &entityInfo
53:                                                        )))
54:                 break;
55:
56:            if ( entityInfo.policy != cVERSIONED )
57:            {
58:                // Post msg that entity is not versioned
59:                rc = camInfoRegisterMsgByKey( pccb
60:                                            , cBLOB_NOT_VERSIONED
```

```
-continued
61:                                            , NO_PREV_ERROR
62:                                            , ERR_BLOB_POLICY_CONFLICT
63:                                            ) ;
64:              break;
65:         }
66:
67:         /*
68:          * Attempt to reserve the current version; if this fails
69:          * because someone else already has it reserved, the extended
70:          * error info will have the name of that reserver
71:          */
72:         if ( CAMUS_SUCCESS != ( rc = clReserveCurrent( pccb
73:                                            , pDSConn
74:                                            , entityID
75:                                            , &versRec )))
76:              break;
77:
78:         /*
79:          * You know, we could commit after getting the reservation
80:          * and decouple the retrieval from the reservation transaction.
81:          * Then if the retrieval failed, the user would still have
82:          * the blob reserved and would need only to get it.
83:          */
84:         rc = dbpGetBlob( pccb, pDSConn, versRec.versionID, pBlob );
85:         break;
86:    }
87:
88:    if ( rc == CAMUS_SUCCESS )
89:    {
90:         CAMUS_ASSERT( CAMUS_SUCCESS
91:             == dsCommitTran( pccb, pDSConn ) );
92:    }
93:    else
94:    {
95:         CAMUS_ASSERT(CAMUS_SUCCESS == dsRollbackTran( pccb, pDSConn ));
96:    }
97:
98:    CAMUS_ASSERT( CAMUS_SUCCESS == dsReturnConnection( pDSConn ) );
99:    return( rc );
100: }
```

This is a workhorse routine or method which performs most of the work in reserving and retrieving a blob. After initializing local variables at lines 14–17, the method "grabs" a connection at lines 30–32. If a connection cannot be successfully grabbed, the method returns an error code at line 34. Otherwise, the method proceeds to line 49 to validate the access policy. At this point, the method calls into the database primary layer, by invoking dbpGetEntityInfo, at lines 49–53. The entity information is returned to the address passed as the fourth parameter, (address of) entity-Info. The call to dbpGetEntityInfo, since it is a call into a database primary layer, is ultimately executed as an SQL statement against the database.

Entity information itself is maintained in an entity record. Such a record may be constructed as follows.

```
        /*
         * Entity record
         */
        typedef struct _entityInfo
        {
            CAMUSID       entityID;
            cFORMAT       format;
            cOBJECTTYPE   type;
            cACCESSPOLICY policy;
            CAMUSID       ownerID;
        } ENTITYINFO, *PENTITYINFO;
```

As shown, the record stores five fields holding the following information. The first field stores an entityID. The second field stores a format (e.g., text, binary, and the like). The third field, type, stores an object type for the entity. The fourth field stores the access policy for the entity. The final field, ownerID, stores an identifier for the owner of the entity.

Returning to the clCheckOutBlob method, at line 56 the method tests whether the access policy for the entity is "versioned." If the entity is not versioned, a message is posted to the system at lines 58–63. Otherwise, the method will proceed to line 72 to attempt to reserve the current version, by calling clReserveCurrent. If the method cannot reserve the entity, an error is returned. If, on the other hand, the method can reserve the entity, the method proceeds to line 84 to retrieve the blob; this is done by a call into the database primary layer, dbpGetBlob. At this point, the method breaks out of the "while" loop established between lines 44–86.

Upon breaking out of this loop, the method tests the success of the operation of getting the blob. Specifically, the return code (rc) is tested at line 88. If the blob was successfully retrieved, the method commits the transaction at lines 90–91. Otherwise, the method rolls back the transaction at line 95. Finally, the method concludes by dropping the connection (line 98) and returning the result code (line 99).

3. Checking in an Object

The methodology of checking in an object is similar to that illustrated for checking out an object. The following description will, therefore, focus on those method steps necessary for understanding the differences between checking an object out and checking an object in.

For creating a new version of an object, the system in essence "checks in a blob." After performing argument validation (in a manner similar to that described above), the system invokes a clCheckInBlob method. This method is the workhorse method for checking in a blob which the user has reserved. In an exemplary embodiment, the method may be constructed as follows.

```
 1:   /*
 2:    * clCheckInBlob()
 3:    *
 4:    * Check in blob that the user has reserved
 5:    */
 6:      CAMUSAPI clCheckInBlob( PCCB          pccb
 7:                            , CAMUSID       entityID
 8:                            , PiSZ          piszComments
 9:                            , PcBLOB        pBlob
10:                            )
11:   {
12:        CAMUS_RC           rc;
13:        PDSCONN            pDSConn;
14:        RESERVATIONINFO    reservation = { 0 };
15:
16:        /*
17:         * See discussion on checkout iso level; we could probably
18:         * get by with ISO 1 here, too, and have better throughput,
19:         * knowing that only these routines will be updating them,
20:         * but it seems safer to leave read locks on the version and
21:         * link rows involved in determining the latest version.
22:         * Do we have a phantom row issue in calculating the next
23:         * major number on the first branch check-in (see calcNextMajor,
24:         * which uses a count(*) of the number of child rows. Wouldn't
25:         * seem bad to perceived committed adds in that count(*); and
26:         * the worst case would be a failure due to an integrity constraint
27:         * violation: of two children with the same parent and the same
28:         * major number. If we ever see an internal ds error like that
29:         * we can bump this to ISO 3.
30:         */
31:        if (CAMUS_SUCCESS != (rc = dsGetConnection( pccb
32:                                                  , &pDSConn
33:                                                  , ISOLATION_2 )))
34:        {
35:            return( rc );
36:        }
37:
38:        /*
39:         * First get the reservation information and verify that
40:         * this guy is reserved for this user. Then calculate
41:         * the version info for the next revision, add the action
42:         * write the next version, remove the reservation, and
43:         * we're done -- commit or rollback
44:         */
45:        while( TRUE )
46:        {
47:            /* verify reservation */
48:            if ( CAMUS_SUCCESS != (rc = dbpGetReservation( pccb
49:                                                         , pDSConn
50:                                                         , entityID
51:                                                         , CHECKOUT_LOCK
52:                                                         , pccb->userID
53:                                                         , &reservation)))
54:                break;
55:
56:            if ( reservation.userID != pccb->userID )
57:            {
58:                rc = camInfoRegisterMsgByKey( pccb
59:                                            , cBLOB_NOT_CHECKED_OUT
60:                                            , NO_PREV_ERROR
61:                                            , ERR_BLOB_NOT_CHECKED_OUT
62:                                            ) ;
63:                break;
64:            }
65:
66:            /*
67:             * Write out the next version and action record with
68:             * comments
69:             */
70:            if ( CAMUS_SUCCESS != (rc = clWriteNextVersion( pccb
71:                                                          , pDSConn
72:                                                          , entityID
73:                                                          , reservation.versionID
```

-continued

```
74:                                           , piszComments
75:                                           , pBlob )))
76:         break;
77:
78:         /*
79:          * Finally, remove the reservation on the ancestor version
80:          */
81:         rc = dbpRemoveReservation( pccb
82:                                  , pDSConn
83:                                  , &reservation
84:                                  ) ;
85:         break;
86:     }
87:
88:     if ( rc == CAMUS_SUCCESS )
89:     {
90:         CAMUS_ASSERT( CAMUS_SUCCESS == dsCommitTran( pccb, pDSConn ) );
91:     }
92:     else
93:     {
94:         CAMUS_ASSERT( CAMUS_SUCCESS == dsRollbackTran( pccb, pDSConn )
);
95:     }
96:
97:     CAMUS_ASSERT( CAMUS_SUCCESS == dsReturnConnection( pDSConn ) );
98:     return( rc );
99: }
```

The method operates by creating a new entity—a new version—for a particular object. Accordingly, much of the housekeeping incurred by the "AddObject" method calls is avoided. The specific steps are as follows. After initializing local variables at lines 12–14, the method obtains a connection at line 31. If a connection cannot be obtained for some reason, an error code is returned at line 35. At lines 47–53, the method verifies that the object (as identified by the entity ID) is reserved. If the object is not reserved by the current user, then an error message is logged (lines 58–62). If an error condition has not arisen, the method may proceed to write out a new version of the object.

At line 66–75, the method invokes clWriteNextVersion, for writing out a new version of the object. The new version includes a version ID for this new version, as well as any user-supplied comments. This action is followed by removing a reservation which was held on the ancestor version of the object, as indicated by lines 78–84.

In the event that the version was successfully added (as indicated by the return code, rc), the method may proceed to commit the transaction, as shown at line 90. Otherwise, the transaction is rolled back, as indicated at line 94. Finally, the method drops the connection at line 97 and returns the result code (rc) at line 98.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

Appendix A: General Concepts and Tutorial of
ObjectCycle™ (Commercial Embodiment)
ObjectCycle™ Concepts
A. ObjectCycle Overview ObjectCycle™ is a next generation, client/server object management facility for software version control and deployment. ObjectCycle is specifically targeted toward the platforms and network services available in a typical Microsoft Windows network and can run on any machine in such a network, providing services to multiple client applications at a time. ObjectCycle manages client/server communication through the Microsoft RPC services of a Microsoft Windows network, and stores its data in a RDBMS such as Sybase SQL Anywhere 5.0 via ODBC.

The ObjectCycle Server is a multi-threaded 32-bit program geared for either Windows NT or Windows 95. It can be stopped and started as a service in Windows NT or as an icon on the Windows 95 or Windows NT desktop. Once the server is initialized, it may immediately begin handling requests from multiple clients (either locally or on the network). The ObjectCycle Server uses a relational database management system to sore its objects.

The ObjectCycle Server uses the ODBC database access standard to communicate with the RDBMS. The RDBMS is used to reliably store and quickly access ObjectCycle objects. Sybase SQL, Anywhere 5.0 is a desktop RDBMS and is included with ObjectCycle. ObjectCycle Manager: The ObjectCycle Manager is an easy-to-use, graphical tool that comes in a 16 bit format for Windows 3.11 or a 32-bit format for Windows 95 and NT. ObjectCycle Manager is intended to be used by both ObjectCycle users and administrators to manage and manipulate data within the Object-Cycle Server.

Development tools and ObjectCycle: ObjectCycle is specifically tuned to provide seamless version control for development tools on the desktop such as PowerBuilder 5.0. To find out more about desktop development tools the user can purchase, the user can see the ObjectCycle installation notes (readme.txt) in the ObjectCycle folder provided by Object-Cycle (Part No. HC0091; Powersoft Corp., Concord, Mass.). ObjectCycle Client Library: The ObjectCycle client library is a Windows DLL that comes in a 16-bit format for Windows 3.11 clients as well as a 32-bit format for Windows 95 and NT clients. The library is a light weight layer that exposes the ObjectCycle API and implements the client-side marshaling of memory provided by the MS RPC mechanism.

B. Client/Server Concepts

ObjectCycle is a network-based client/server facility. The server component is ObjectCycle Server; the client component is ObjectCycle Manager, or other clients such as PowerBuilder. Client/Server communications are managed by Microsoft RPC. ObjectCycle Server, which developers access from their own machines, stores and tracks the development history of objects. The data is stored in the Sybase SQL Anywhere 5.0 relational database that comes with the ObjectCycle Server.

An administrator installs ObjectCycle Server on the network, and sets up projects and user access. With ObjectCycle Manager installed on the user's machine, the user logs on to the ObjectCycle Server and uses the ObjectCycle Manager to perform operations on objects under the user's control, and to track what is happening on the team project. To find out how ObjectCycle implements version control, see Version control concepts. To understand the different user roles, see User role concepts.

C. Version Control Concepts

Version control is a methodology used by development teams to control and track changes to code, ensure that the correct version of the code is deployed, and facilitate the deployment process. ObjectCycle makes all these tasks easy. The ObjectCycle Manager lets the user represent a real-world development project in a hierarchical graphical view that maps to the file system. From the ObjectCycle perspective, an ObjectCycle project is partitioned into folders containing ObjectCycle objects, which represent the application objects stored in the ObjectCycle Server.

Once the user's project and user access have been set up in ObjectCycle Server, the user will perform versioning activities such as: Check out—borrow an object to edit; prevent others from accessing while it is being edited; Check in—return modified objects to create new versions; Get—copy one or multiple objects to the user's local directory; View reports—quickly view project activity status; Label—assign a name to one or more objects for group operations; and Create builds—use labels to restore older versions.

To understand the different user roles in ObjectCycle, see User role concepts. The tutorials show how versioning activities are performed on a typical C code project.

D. User Role Concepts

User role concepts. ObjectCycle recognizes three user roles: User, Administrator, and Inactive. An administrator assigns user roles for each ObjectCycle project.

| Role | Description |
| --- | --- |
| Administrator | A user who prepares and maintains ObjectCycle for use by the team on one or more projects. |
| User | Developer who uses ObjectCycle Manager to check objects in and out, get copies of objects, and other basic operations. |
| Inactive | A user who is only authorized to browse projects. |

ObjectCycle gives the user flexibility in these roles so that the user can do his/her development work most effectively. For example, the user may need to be both a user and an administrator on a project. The user's team may want to have several administrators with different responsibilities.

The tutorials show how users in different roles perform version control activities on a typical project.

E. Project Set-up

Setting up a project. This section is directed to the person who will perform administrator functions to set up projects and user access. For practice in doing administrator tasks on a sample project, see the Administrator tutorial.

To prepare ObjectCycle for team development:

1. With ObjectCycle Server running, double-click the ObjectCycle Manager icon. The ObjectCycle Manager main window opens.

2. Select File→Open. The Open Project dialog displays.

3. Log on as administrator, using the following values:

| Field | Default (first log on) |
| --- | --- |
| User Name | admin |
| Password | camus |
| Project | system |
| Server | (Name of the user's ObjectCycle Server machine) |

When the user clicks OK, the ObjectCycle Manager project browser window opens, displaying the default project 'system'.

The user can use this project, or create a new one for his/her team. Frequently-used menu command; are available from the toolbars.

4. Partition and populate the default project (using the File→New→Folder and File→New→Object commands) or create a new project (using the File→New→Project command).

5. Create user names, passwords and project access for each user on the project (see Configure→Users command). Tip: Be sure to enter a new password for each user as his/her future login.

6. Let the users know their log on information.

Tutorial Help

A. Tutorial Overview

There are three tutorials in this section: one for the administrator, who sets up projects and user access, one for an administrator who is responsible for release management, and one for a user working on a typical project. (These roles are explained in user role concepts.) On any project, the user might have one or more of these roles.

ObjectCycle administrators should do all three tutorials to get a good understanding of how to use ObjectCycle on a typical project.

B. Administrator Tutorial

This tutorial demonstrates how to create and partition a sample C code project and assign user access for the project. For this tutorial, the user must log on as an administrator.

This tutorial has two sections:

A. Create and partition the sample project
B. Assign user access

To create and partition the sample project:

1. Locate a shared disk to contain the baseline files on the machine on which ObjectCycle Server is installed.

2. Set up a directory tree on the shared disk, with a directory called ProjectA, and three subdirectories called Client, Server, and Tools, as in the example (using the C drive):

c:\PROJECTA
c:\PROJECTA\CLIENT
c:\PROJECTA\SERVER
c:\PROJECTA\TOOLS

3. With ObjectCycle Server running, double-click the ObjectCycle Manager icon. The ObjectCycle Manager main window opens.

4. Select File→Open and log on to the ObjectCycle Server as an administrator.

If this is the user's first time logging on as an administrator, the following values are used. Otherwise one logs on with a password the user has set for himself/herself

| Field | Defaults |
|---|---|
| User Name | admin |
| Password | camus |
| Project | system |
| Server | (Name of the user's ObjectCycle Server machine) |

When the user clicks OK, the ObjectCycle Manager project browser window opens, displaying the default project 'system'. Take a moment to look at the menus and toolbar. Most commands the user will need are on the toolbars. The user will create the new project for his/her team called "projectA".

5. Select File→New→Project, enter the name "projectA" and a project description in the dialog, and click OK. A new project browser displays on top of the default system project, and now the user is ready to partition the project. (The browser window can contain multiple projects for each session.)

6. Select File→New→Folder (or click the New Folder icon), enter the folder name "Client" and click OK. With the root projectA selected, repeat this process to create the "Server" and "Tools" folders.

The user has just created and partitioned a project. The next task is to assign user access to this project.

To assign user access:

1. Select Configure→Users. "admin" appears s the user's username. Before the user creates other user profiles the user will change his/her password.

2. Highlight "Admin", click the Edit button and type a new password.

Re-enter it in the Verify field.

3. Select "projectA" as the user's default project, and Admin as the user's role, and click OK.

4. Click Add on Configure Users Browser dialog to create two user profiles, one for a user called Mike (no password, default project=projectA, user role=user) and one for Suzanne (default project=projectA,user role=admin). Suzanne will be the release manager. Mike will be a developer.

Note: The user can create a user without a password by not typing anything in the Password field.

At this point, the user has created a project and assigned user privileges. Now the user can try the Release manager tutorial to see how Suzanne will populate the project and carry out release manager activities.

C. Release Manager Tutorial

This tutorial demonstrates how to populate the project namespace created in the Administrator tutorial, and how to deploy a release of the software. To do this tutorial, the user will log on as the administrator "Suzanne" (created in the Administrator tutorial).

This tutorial includes the following sections:
A. Create a Map Directory
B. Populate ProjectA with objects
C. Deploy a release of ProjectA code To create a Map Directory:

1. With the ObjectCycle Server running, double-click the ObjectCycle Manager icon. The ObjectCycle Manager main window opens.

2. Select File→Open and log on to the ObjectCycle Server with the following values:

| Field | Default values |
|---|---|
| User Name | suzanne |
| Password | (leave blank) |
| Project | projectA |
| Server | (Name of the user's ObjectCycle Server machine) |

When the user clicks OK, the ObjectCycle Manager project browser window opens, displaying the default project 'system'. Take a moment to look at the menus and toolbar. Most commands the user will need are on the toolbars.

3. Select Configure→Preferences, and on the Map Directory tab, enter the letter for the Map Directory (created in Step 2 of the Administrator tutorial).

4. Click Default. Clicking Defaults adds the Map Directory to the list. The user can edit any line if needed.

5. Click Create Directories. This creates the directories as indicated.

6. Select the File Type tab and click Defaults. This populates the default file types for the user's use. Note that each of them has an icon to make it easy to identify the file type (e.g., .c, .h, .def, .rc, .mak, .bat, .txt, .bmp).

7. When the user is done adding file types, he or she clicks OK to exit from Preferences. A SUZANNE.INI object appears in the browser object view. This object stores the user profile information.

To populate ProjectA with objects:

1. Select the Server folder and select File→New→Object.

2. If necessary, click Browse and select an object for this folder.

3. In the New Object dialog, enter any comments to describe this object (e.g., "This module provides server transaction control services."). Notice that Object Name, File name, Format, and User values are entered for the user. The default access is "versioned." Click OK to exit the dialog.

4. Repeat the above steps so that the user has at least 2 versioned objects in each of the three folders.

Now the user is ready to deploy a release of his/her software. To do this, the user will create a "Beta01" label and perform a Get operation on all objects belonging to this label. (In a real situation, first check with all users to verify that they have checked in their final code.)

To deploy a release of ProjectA code:

1. Select the root ProjectA, and right-click to display the tree view popup menu.

2. Select Get from the popup menu. This displays the Get Objects dialog. This dialog lets the user Get objects from ObjectCycle to the file system and optionally label those objects. If the user selects; the Label option, a label object is automatically created in the Project Objects folder. The user can deploy all objects in the selected folder, or optionally include the subfolders.

The user will use the Get Objects feature to create a label for all objects in the ObjectCycle project and deploy them to a new release, "Beta01".

3. Check the Include subfolders box. This tells ObjectCycle to apply the Get command to all objects in the project (since the user selected the root project in Step 1.)

4. Check the Label box and in the Label box, type the label name, "Beta01". Notice that if the user had other labels in the project the user could select them from the drop-down list.

5. Add a descriptive comment in the Comments box if the user chooses, and click OK when the dialog is complete. ObjectCycle labels all the objects in the user's project and performs a Get operation.

Now, the user has just deployed a release of his/her software.

To understand what the users are doing, see the User tutorial.

D. User Tutorial

The user tutorial demonstrates how a user performs typical version control activities on a project. This tutorial has three sections:

A. Create a new version
B. Restore an earlier version
C. Version a deleted file

Introduction

A typical ObjectCycle user is a developer or author on a team who is creating versions of code and documentation. ObjectCycle assists the user in his/her work by providing mechanisms for: Preventing others from modifying an object (file) while the user is editing it; automatically incrementing version numbers when the user returns (check in) a modified object; tracking who on the team has checked out or checked in other modules the user and the team need to know about; getting copies of objects from ObjectCycle to the user's file system when the user needs to verify their contents or start versioning them; letting the user assign labels to related objects to identify and work with them as a group; and creating new releases and restoring earlier versions quickly whenever needed.

There are only a few commands needed to do the above tasks. They are Check Out, Check In, Clear Checkout, Get and Label.

This tutorial depends on the setup work done in the Administrator tutorial, in which an administrator created ProjectA in ObjectCycle and set up access for a user called Suzanne. Users can only log on to ObjectCycle and use it on a project when an administrator has done this initial setup.

Once the user is working on a project, he/she can perform any operations on objects except moving, renaming, clearing the Checkout status, and destroying label objects, folder, and projects (only an administrator can do these operations).

To prepare for this tutorial:

1. With the ObjectCycle Server running, double-click the ObjectCycle Manager icon. The ObjectCycle Manager main window opens.

2. Select File→Open and log on to the ObjectCycle Server with the following values:

| Field | Default values |
|---|---|
| User Name | mike |
| Password | (leave blank) |
| Project | projectA |
| Server | (Name of the user's ObjectCycle Server machine) |

When the user clicks OK, the ObjectCycle Manager project browser window opens, displaying the default project 'system'. Take a moment to look at the menus and toolbar. Most commands the user will need are on the toolbars.

3. Select Configure→Preferences, and on the Map Directory tab, enter the letter for the Map Directory (created in Step 2 of the Administrator tutorial).

4. Click Defaults. Clicking Defaults adds the Map Directory to the list. The user can edit any line if needed.

5. Click Create Directories and click OK. This creates the directories as indicated.

6. With a folder selected, select File→New→Object and add an object to the project.

A. Creating a New Version

To create a new version of an object, the user's main activities will be to: check out the ObjectCycle object so that the user can modify it, and check in the modified object to ObjectCycle to create a new version 1. With ProjectA in the user's browser window, open a folder containing an object.

2. Select an object, and select File→Check Out. A confirmation dialog appears with the file name indicated.

3. Click OK on the Check out Object to File dialog.

Notice the lock icon that appears on the ObjectCycle object (shown in the project browser). No other user can modify this object while the user has it checked out to his/her file system.

4. Select View→Checkout Report and notice that ObjectCycle has recorded the information (object, user, version, date) so that the user's team members know which objects can view the ongoing checkout status. While the user has the object checked out, other users can view it by double-clicking it and selecting the Get command.

At this point the user is ready to make modifications to his/her object. Let's assume the user has done his/her editing and is ready to create the new version.

5. Select the ObjectCycle object representing the modified file, and select File→Check in (or the Check In icon).

6. In the Check in Object dialog, add a comment about the user's changes, such as "Fixed bugs 45 and 56" and click OK. ObjectCycle unlocks the object and increments the version number. It removes the file from the user's local directory. As a final step, take a look at the information that ObjectCycle has stored about the brief history of the user's object.

7. Select the object, right-click and select Properties from the object view popup menu. Notice that the Description tab stores information about the object, the History tab shows the activities on it, and the Label tab provides label information.

Now, the user has just created a version, using the Check Out and Check In commands. Along the way the user looked at the Checkout Report, and Object Properties. The user also used the popup menu as an alternative to the File menu. In a real situation, the user might need to complete this process by checking the object out again, to retain authorship over the new version. If the user wants to create a version consisting of multiple objects, try out Section C of the Release manager tutorial.

B. Restoring an earlier version

Sometimes the user needs to restore an earlier version of one or more objects.

To restore an earlier version, the user's main activities will be to: check out the ObjectCycle object to establish control of it; get the modified object to the user's Map Directory and overwrite the user's existing (i.e., incorrect) file;and check in the modified object to ObjectCycle to restore the version. To do this section of the tutorial, the user must be logged on as the user Mike to ProjectA (as explained in Section A).

1. With ProjectA in the user's browser window, select an object, and select File→Check Out. Click OK on the Check out Object to File dialog. Next the user needs to copy the earlier version to his/her local directory, which currently has the incorrect or undesired version.

2. Select the ObjectCycle object and select File→Get. This copies the object to the user's directory.

3. When prompted, confirm that the user wants to overwrite his/her local (incorrect) file. At this point the user can make modifications, if needed, or simply check the object back in. Let's assume the user is ready to restore the correct version.

4. Select the ObjectCycle object and select File→Check in.

5. In the Check in Object dialog, add a comment about the user's changes, such as "Restored previous version to fix bug 78" and click OK. ObjectCycle unlocks the object and increments the version number.

Now, the user has restored the correct version of his/her software. To do this on a group of objects, the user can select the folder(s) containing them and use the File→Get command to label and restore them as a group.

C. Versioning a deleted file

Sometimes the user needs to version an object which has been deleted from his/her directory. To create a version in this situation the user will do the following: get a copy of the ObjectCycle object to the user's local directory; Check Out the object to gain control of it and make any edits; and Check In the object. To do this section of the tutorial, the user must be logged on as the user Mike to ProjectA (as explained in Section A).

1. With ProjectA D in the user's browser window, double-click an object and select Get. The Open Object dialog lets the user choose to Get or Checkout an object. It runs the file the user is getting so that the user can view the contents to verify. Now the user can establish control of the object.

2. Select the ObjectCycle object and select File→Check Out. At this point the user can make modifications if needed or simply check the object back in. Let's assume the user is ready check it in.

3. Select the ObjectCycle object and select File→Check in.

4. In the Check in Object dialog, add a comment about the user's changes, such as "Versioned the deleted file" and click OK. ObjectCycle unlocks the object and increments the version number.

Now, the user has restored, recovered and versioned a deleted file.

A similar process would be followed if the user needed to take ownership of an object currently checked out by another user. The user would have the administrator clear the checkout status of the object and then follow the 4 steps above.

ObjectCycle Manager

A. ObjectCycle Manager Overview

ObjectCycle Manager is the graphical utility for performing version control, deployment, and administration of users, projects, and objects in the ObjectCycle Server.

After the initial setup, ObjectCycle Manager makes it easy for the user to manage his/her projects.

With ObjectCycle Manager, the user can: create and destroy projects; add, rename, move, delete and destroy objects; easily view the status of objects and their attributes assign icons to identify types of objects visually; check out and check in versioned objects; get copies of objects to the user's file system to view; check out copies of objects to the user's file system; display the status of checked-out objects; assign labels to objects and filter version lists by this label; view version history; view and print reports on objects and versions; create a new release of the user's application; and restore earlier versions of objects.

B. ObjectCycle Manager Main Window

When the ObjectCycle manager starts up, the ObjectCycle Manager main window appears. This is an MDI (Multiple Document Interface) window.

From the main window the user opens, closes or creates a new project, manipulates the window and frame toolbar, selects Help, or exits from ObjectCycle Manager.

C. Project Browsers

When the user opens or creates a new ObjectCycle project, the ObjectCycle Manager displays a project browser (the child window) to let the user view and manage folders, ObjectCycle objects, and label objects. ObjectCycle Manager displays separate project browsers for each session.

The project's server name, project name, and user name appear on the title bar of the project browser. A top level folder showing the name of the user's project, and a read-only folder called Project Objects are created. The Project Objects folder contains the project objects maintained by ObjectCycle, such as label objects.

The project browser has a tree view on the left, and an object view on the right.

| The tree view displays... | The object view displays... |
|---|---|
| Project or folders containing ObjectCycle objects | ObjectCycle objects and label objects |
| Click the plus or minus to expand or collapse access the tree and select a folder. | Left-click to select an object and to the object view popup menu |
| Click a folder to display or refresh the display of objects in the object view menu | Right-click in a clear space in the object view to display the object view popup |
| Right-click and hold on a folder name to do a Rename | Click and hold on the object name to do a Rename |
| | Double-click an object to view or edit the object |

D. Command Access

The user can access ObjectCycle Manager commands from the menus, from the toolbars, or from context-sensitive popup menus. The user can look up a command in Help by menu, toolbar, or popup menu in the Command Reference section.

There are six menus: File, Edit, View, Configure, Window, and Help. Some commands are only enabled when the user has first selected an object or folder on which to perform an operation.

Frequently-used commands are available by clicking icons on a toolbar. There are two toolbars for quick access to these commands, the frame toolbar, and the project browser toolbar.

In addition, most menu commands are available on context-sensitive popup menus in the Windows 95 style by right-clicking the mouse.

Command Reference

A. Toolbars

ObjectCycle Manager provides two toolbars for quick access to most ObjectCycle functions. The top toolbar is the frame toolbar; the configurable toolbar is the project browser toolbar.

Select Window→Toolbars and click Show Text to familiarize the user with the convenience of the toolbars. The Toolbars dialog also lets the user move, show/hide the toolbar and display tips.

| Frame toolbar | Click this icon to . . . |
|---|---|
| Open Project | Open an existing project |
| Close | Close opened project |
| Exit | Exit ObjectCycle Manager |
| Help | Display ObjectCycle Manager Help |

For any of the following commands that operate on an existing object or folder, select the object or folder name first:

| Browser toolbar | Click this icon to . . . |
|---|---|
| New Folder | Create a new folder under current folder |
| New Object | Create a new object in currently selected folder |
| Check Out | Check out an ObjectCycle object's data to a file. |
| Check In | Check in an object from a file |
| Get | Copy an object(s) to a file. |
| Put | Update a writeable object |
| Label | View, add or remove label(s) |
| Cut | Cut an object that the user wants to paste to another folder (cut/paste is the same as drag and drop or move) |
| Copy | Copy a version of an object to the clipboard |
| Paste | Paste a cut or copied version of an object to a selected folder |
| Delete | Delete selected folder, object or label object |
| Undo Delete | Remove status of Delete on a folder or object |
| Destroy | Permanently remove deleted objects, folders, projects |
| Rename | Rename selected folder or object |
| Properties | View properties of selected object |
| Print | Print a report or active window |

B. File Menu

Use the File menu to create, open and close projects, create and manage folders and ObjectCycle objects.; perform version control functions; and print project information.

For any of the following commands that operate on an existing object or folder, select the object or folder name first:

| Command | Select to . . . |
|---|---|
| File->New->Project | Create a new project |
| File->New->Folder | Create a new folder under the current folder |
| File->New->Object | Create a new object in the currently selected folder |
| File->Open | Open an existing project |
| File->Close | Close the current project and session |
| File->Check Out | Check out an ObjectCycle object's data to a file |
| File->Check In | Check in an object from a file |
| File->Clear Checkout | Remove Checkout status from an object |
| File->Get | Copy an object(s) to a file. |
| File->Put | Update a writeable object |
| File->Label | View, add or remove label(s) |
| File->Destroy | Permanently remove deleted objects, folders, projects |
| File->Rename | Rename a selected folder or object |
| File->Properties | View properties of selected object |
| File->Print | Print a report or active window |
| File->Print Setup | Verify or change default print settings |
| File->Exit | Exit from ObjectCycle Manager |

C. Edit Menu

Use the Edit menu to Cut, Copy and Paste versions of objects; and to Delete folders and objects. Only an administrator can Cut and Paste (Move) an object from one folder to another.

Click underlined commands and terms for more details.

| Command | Select to . . . |
|---|---|
| Edit->Cut | Cut an object that the user wants to paste to another folder (cut/paste is the same as drag and drop or move) |
| Edit->Copy | Copy a version of an object to the clipboard |
| Edit->Paste | Paste a cut or copied version of an object to a selected folder |
| Edit->Delete | Delete a selected folder, object or label object |
| Edit->Undo Delete | Remove status of Delete on a folder or object |

D. View Menu

Use the View menu to change the Object view and produce Checkout Reports.

Click underlined commands and terms for more details.

| Command | Select to . . . |
|---|---|
| View->Large icons | Display objects as large icons |
| View->Small icons | Display objects as small icons |
| View->List | Display objects in list format |
| View->Report | Display report with details (user, date, size) |
| View->Sort | Sort object list in ascending or descending order |
| View->Checkout Report | Produce report of objects currently checked out |

E. Configure Menu

Use the Configure menu to set user preferences for the user's project. The administrator also uses this menu to enter and modify user accounts. Click underlined commands and terms for more details.

| Command | Select to . . . |
|---|---|
| Configure->Users | Add or edit a user profile (admin only) |
| Configure->Preferences and | Set user preferences for the current project -- Map Directory |
|  | File Types |

F. Window Menu

Use the standard Window menu to manipulate the windows and toolbars. Click underlined commands and terms for more details.

| Command | Select to . . . |
|---|---|
| Window->Tile Horizontal | Arrange windows horizontally |
| Window->Tile Vertical | Arrange windows vertically |
| Window->Layer | Layer windows |
| Window->Cascade | Cascade windows |
| Window->Arrange Icons | Clean up the object icon display |
| Window->Toolbars | Move, change display attributes, or hide/show the toolbars. |
| Window->Refresh | Update the information displayed in the project browser |

G. Popup Menus

Popup menus are available by right-clicking in a specific area of the project browser window in keeping with Windows 95 usage. Each popup menu item is also available as a menu command in keeping with Windows 3.11 usage.

| Use the Tree view to . . . | Use the Object view to . . . |
|---|---|
| Perform functions on folders. | Perform functions on objects or on the viewer (e.g., change to sort order in the object list) |
| (1) Right-click to display the Tree view popup menu | (1) Select an object and right-click to display the Object popup menu |
| (2) Click the read-only Project Objects folder to display project objects | (2) Without selecting an object, right-click in this panel to display the Object view popup menu |

What is claimed is:

1. In a development system for creating programs from objects, an improved method for managing versions of the objects, the method comprising:

providing a meta model for presenting to a user the objects and versions thereof as a hierarchical representation;

for each object created, performing substeps of:

creating in said hierarchical representation a single entity node for representing the object, and creating in said hierarchical representation at least one name node for representing one or more names for the object; and for each version created for each corresponding object, creating in said hierarchical representation an instance node for representing said each version for each object, wherein said hierarchical representation conveys to the user a relationship between each version and its corresponding object and conveys any semantic relationships existing between said objects.

2. The method of claim 1, wherein each entity node of an object is linked to at least one name node for that object.

3. The method of claim 1, wherein each entity node of an object is linked to at least one instance node for that object.

4. The method of claim 3, wherein a plurality of versions exist for a particular object, and wherein said plurality of versions are represented in the meta model by a chain of instance nodes, each instance node being linked to any instance node of a prior version.

5. The method of claim 4, wherein at least two instance nodes are linked to the same instance node of a prior version, thereby creating a new branch of versions for the object.

6. The method of claim 1, wherein said objects comprise text-based objects.

7. The method of claim 6, wherein said text-based objects comprise source listings.

8. The method of claim 1, wherein said objects comprise non-text based objects.

9. The method of claim 8, wherein said non-text based objects comprise bit map resources.

10. The method of claim 8, wherein said non-text based objects comprise objects having hypertext markup language (HTML) script.

11. The method of claim 1, further comprising:

receiving input from a user for specifying semantic relationships between objects; and in response to said input, capturing said semantic relationships in the meta model.

12. The method of claim 11, wherein said capturing step includes storing a links node for representing each semantic relationship between two objects.

13. The method of claim 12, wherein each links node stores a link type for characterizing the semantic relationship represented by the node.

14. The method of claim 1, further comprising:

receiving input from a user requesting an action for an object; and in response to said input requesting an action, storing an action node characterizing the requested action and performing the action requested by the user on the object.

15. The method of claim 1, wherein each entity node includes an entity ID for uniquely identifying each object managed by the system.

16. The method of claim 1, further comprising:

creating in the hierarchical representation a projects node for representing a program being created; and linking the entity nodes of the objects to the projects node, so that each object is associated with a particular project.

17. The method of claim 1, wherein each instance node is associated with a blob (binary large object) record stored in a database table.

18. The method of claim 17, wherein each blob record stores a size for a particular version of an object together with data which comprises that particular version.

19. The method of claim 18, wherein each blob record further stores the data which comprises the particular version in a compressed format and wherein said size includes both a compressed size and an uncompressed size for the data.

20. The method of claim 1, further comprising:

displaying a browser view of the object employed for creating a program; and receiving user input from the browser view for undertaking individual actions on user-selected objects.

21. The method of claim 1, further comprising:

receiving user input for checking out a particular version of an object; and in response to said user input for checking out a particular version, reserving the particular version for the user and transmitting a copy of that particular version to the user.

22. The method of claim 21, wherein said receiving step includes creating a reserve node for the particular version for indicating that it is reserved by the user.

23. The method of claim 22, wherein said reserved node is linked to the instance node for the particular version being reserved.

24. The method of claim 21, wherein said reserved node stores a reservation type indicating the nature of the check out by the user.

25. The method of claim 1, wherein each version comprises an entire copy of a particular version of an object.

26. An object versioning system comprising:

a server computer having a processor, a memory, and a storage device;

at least one client computer connected through a network to the server computer, said at least one client computer having a development system for creating programs from objects, said server computer having a versioning engine for managing different versions of objects; and means for presenting the objects to a user as a hierarchical representation with a meta model, so that for each object created, the server computer stores a single entity node for representing the object and stores at least one name node for representing one or more names for the object, and so that for each version created for each object the server computer stores an instance node for representing the version of each object, so that said hierarchical representation conveys to the user a relationship between each version and its corresponding object.

27. The system of claim 26, wherein each entity node of an object is linked to at least one name node for that object.

28. The system of claim 26, wherein each entity node of an object is linked to at least one instance node for that object.

29. The system of claim 28, wherein a plurality of versions exist for a particular object, and wherein said plurality of versions are represented in the meta model by a chain of instance nodes, each instance node being linked to any instance node of a prior version.

30. The system of claim 29, wherein at least two instance nodes are linked to the same instance node of a prior version, thereby creating a new branch of versions for the object.

31. The system of claim 26, wherein said objects comprise text-based objects.

32. The system of claim 31, wherein said text-based objects comprise source listings.

33. The system of claim 26, wherein said objects comprise non-text based objects.

34. The system of claim 33, wherein said non-text based objects comprise bit map resources.

35. The system of claim 33, wherein said non-text based objects comprise objects having hypertext markup language (HTML) script.

* * * * *